United States Patent [19]

Nakajima

[11] Patent Number: 5,283,662
[45] Date of Patent: Feb. 1, 1994

[54] IMAGE READING APPARATUS CONTROLLABLE BY EXTERNAL APPARATUS

[75] Inventor: Akio Nakajima, Osaka, Japan

[73] Assignee: Minolta Camera Kabushiki Kaisha, Osaka, Japan

[21] Appl. No.: 865,860

[22] Filed: Apr. 9, 1992

[30] Foreign Application Priority Data

Apr. 10, 1991 [JP] Japan .................................. 3-077619
Apr. 10, 1991 [JP] Japan .................................. 3-077620
Apr. 10, 1991 [JP] Japan .................................. 3-077621
Apr. 10, 1991 [JP] Japan .................................. 3-077622

[51] Int. Cl.$^5$ ............................................. H04N 1/40
[52] U.S. Cl. ..................................... 358/409; 358/410
[58] Field of Search .................... 358/451, 409–410, 358/448, 400

[56] References Cited

U.S. PATENT DOCUMENTS

| | | | |
|---|---|---|---|
| 3,967,243 | 6/1976 | Kawa | 382/46 |
| 4,222,102 | 12/1983 | Tamura | 358/302 |
| 4,679,096 | 7/1987 | Nagashima | 358/451 |
| 4,691,237 | 9/1987 | Shimizu | 358/256 |
| 4,760,466 | 7/1988 | Nakamura | 358/294 |
| 4,807,044 | 2/1989 | Kikuchi et al. | 358/448 |
| 4,860,118 | 8/1989 | Arimoto | 358/451 |
| 4,893,194 | 1/1990 | Sakata | 358/443 |
| 4,992,888 | 2/1991 | Nagashima | 358/410 |

FOREIGN PATENT DOCUMENTS 59-70358  4/1984  Japan .

Primary Examiner—Stephen Brinich
Attorney, Agent, or Firm—Burns, Doane, Swecker & Mathis

[57] ABSTRACT

In an image reading apparatus, a signal generator generates a clock signal having a predetermined frequency, and generates a horizontal synchronizing signal in synchronous with the clock signal, and an image sensor reads a document image by scanning the document image in a main scan direction every horizontal scanning line in synchronous with the clock signal, and converts the read document image into an image signal. On the other hand, a stepping motor moves the image sensor and the document image relatively to each other in a subscan direction perpendicular to the main scan direction by one horizontal scanning line in synchronous with the clock signal. Further, a signal interface outputs the horizontal synchronizing signal and the image signal to an external apparatus. On the other hand, a receiver receives a stop request signal from the external apparatus. A controller controls the signal interface to stop the operations of the stepping motor and the signal interface, in response to the received stop request signal.

19 Claims, 32 Drawing Sheets

Fig. 9 A portion of 75

IMAGE READING APPARATUS CONTROLLABLE BY EXTERNAL APPARATUS

BACKGROUND OF THE INVENTION

1. Field of the Invention

The present invention relates to an image reading apparatus for reading an image of a document (referred to as a document image hereinafter) and converting the read image into an image signal, and more particularly, to an image reading apparatus controllable by an external apparatus such as a data processing apparatus, a controller of an image filing system, a host computer, a microcomputer, or the like.

2. Description of the Prior Art

Conventionally, there has been suggested an image reading apparatus for reading image information such as characters, a document image or the like which is typed or printed on a piece of paper, converting the read image information into digital image signal and outputting it to a printer so as to make a hard copy thereof, or outputting the converted digital image signal to an external data processing unit such as a controller of an image filing system, a host computer, a microcomputer or the like and displaying an image thereof on a display unit connected thereto. As the image reading apparatus of this type, there has been suggested, for example, in U.S. Pat. No. 4,691,237, an image reading apparatus (referred to as a first conventional apparatus hereinafter) capable of selecting either one of receiving a horizontal synchronizing signal or a vertical synchronizing signal of a digital image signal from an external data processing unit and generating them within an internal circuit thereof upon operating in cooperation with an image output unit such as a printer or the like, or upon operating as an input unit of an image filing system.

In the above-mentioned first conventional image reading apparatus, a horizontal synchronizing signal having a predetermined frequency is generated in the internal circuit thereof, and the horizontal synchronizing signal is used as a synchronizing signal upon transferring a digital image signal to a host computer of a system, and is also used as a horizontal synchronizing signal upon reading image information by scanning it in a main scan direction using an CCD image sensor.

However, in the first conventional image reading apparatus, as described above, since the horizontal synchronizing signal having the predetermined frequency is generated in the internal circuit thereof and the horizontal synchronizing signal is used as not only the synchronizing signal upon transferring the digital image signal to the host computer of the system but also the horizontal synchronizing signal upon reading image information by scanning it in the main scan direction using the CCD image sensor, the image reading apparatus can not respond every horizontal scanning line of the image signal to a request for outputting the image signal or another request for interrupting the operation of reading the image information.

Further, in the first conventional image reading apparatus, since the horizontal synchronizing signal having the predetermined frequency is generated, the output rate of the image signal from a scanner is previously set to a predetermined value. Therefore, in the first conventional image reading apparatus, available external data processing units are limited depending on the output rate of the image signal from the scanner.

Further, in the first conventional image reading apparatus, when performing a process for converting the resolution of the image (referred as a resolution conversion process hereinafter) such as a process for converting an image signal into the image signal having a higher resolution by increasing the image signal of one horizontal scanning line read by the scanner into the image signal of a plurality of horizontal scanning lines, or another process for converting an image signal into the image signal having a lower resolution by decreasing the image signal of a plurality of horizontal scanning lines into the image signal of one horizontal scanning line, the frequency of the horizontal synchronizing signal is changed depending on the contents of the resolution conversion process, and then, as a result, the converted image signal can not be outputted to the external data processing unit. Thus, the first conventional image reading apparatus can not perform the resolution conversion process for the image data read by the scanner.

Further, there is disclosed in U.S. Pat. No. 4,992,888 and has been known to those skilled in the art, an image reading apparatus (referred to as a second conventional apparatus hereinafter), which is not an apparatus for performing the above-mentioned resolution conversion process for the image data read by the scanner, but is capable of performing a magnification process or a density conversion process in a subscan direction perpendicularly to the main scan direction in which sensor elements of the CCD linear image sensor are disposed, by making an reference signal supplied to the linear image sensor synchronous with a driving pulse signal for driving a stepping motor of pulse motor for moving an optical system used for reading a document image and by controlling the driving pulse signal to be applied to the stepping motor.

However, the second conventional image reading apparatus has not only such a problem similar to that of the first conventional apparatus that it can not perform the resolution conversion process but also the following problems. In order to achieve a higher magnification ratio, it is necessary to control the stepping motor in a higher speed, and then it is necessary to design the stepping motor taking into consideration a torque in the maximum speed and margins thereof. As a result, it is necessary to adopt an expensive stepping motor having a relatively high performance, resulting in heightening the manufacturing cost of the image reading apparatus.

In other general conventional image reading apparatus, an image signal having image information for a predetermined time interval in the subscan direction is sent to a data processing unit such as a printer, a computer or the like in synchronous with only a vertical synchronizing signal generated by an internal circuit thereof. Then, the external data processing unit receives and takes therein only the image signal for the predetermined time interval in the subscan direction which is necessary to be processed therein, and then, performs a predetermined image process for the taken-in image signal. Therefore, the conventional image reading apparatus of this type is constituted such that a size of an image and a resolution which can be accepted by the predetermined external data processing unit are previously set, and a vertical synchronizing signal is generated in the internal circuit thereof.

Recently, there have been developed various kinds of external data processing units respectively having a various kinds of performances which are used for processing image data, and the external data processing units may be connected to image reading apparatuses. However, since the conventional image reading apparatus has the above-mentioned composition, it can be connected to only a particular data processing unit having a corresponding predetermined performance. Therefore, for example, even though the specifications of the external data processing unit has been already known, the specifications of the interface of the image signal of the external data processing unit may not coincide with those of the image reading apparatus, and then, the image reading apparatus having been bought already may not be connected to the external data processing unit. In other cases, the specifications of the external data processing unit are not known, and then, it can not be judged whether or not the external data processing unit can be connected to the image reading apparatus.

In these cases, in such a case that a time interval in the subscan direction of the image signal to be processed by the external data processing unit is larger than that of the image signal inputted from the image reading apparatus thereto, or in such another case that the resolution of the image signal to be processed by the external data processing unit is relatively high even though that the time interval in the subscan direction of the image signal to be processed by the external data processing unit is the same as that of the image signal inputted from the image reading apparatus thereto, there may be caused the following trouble. Namely, since the external data processing unit can not receive the image signal, the data processing unit may stop the receiving process still in such a state of taking the image signal therein.

SUMMARY OF THE INVENTION

An object of the present invention is therefore to provide an inexpensive image reading apparatus having a simple structure, which is capable of responding every horizontal scanning line to a request for outputting an image signal or request for interrupting the image reading operation, which is outputted from an external data processing unit.

Another object of the present invention is to provide an image reading apparatus capable of changing an output rate of an image signal from an scanner depending on respective processing performances of various kinds of data processing units for processing image data.

A further object of the present invention is to provide an image reading apparatus capable of outputting an image signal suitable for a resolution conversion process.

A still further object of the present invention is to provide an image reading apparatus capable of outputting an image signal which can be received by an external data processing unit without any trouble independent of the time interval in the subscan direction of the image signal to be processed by the external data processing unit.

In order to achieve the aforementioned objective, according to one aspect of the present invention, there is provided an image reading apparatus comprising:

signal generating means for generating a clock signal having a predetermined frequency, and generating a horizontal synchronizing signal in synchronous with said clock signal;

image reading means for reading a document image by scanning said document image in a main scan direction every horizontal scanning line in synchronous with said clock signal, and converting said read document image into an image signal;

moving means for moving said image reading means and said document image relatively to each other in a subscan direction perpendicular to said main scan direction by one horizontal scanning line in synchronous with said clock signal;

signal outputting means for outputting said horizontal synchronizing signal and said image signal to an external apparatus;

receiving means for receiving a stop request signal from said external apparatus; and control means for controlling said moving means and said signal outputting means to stop the operations of said moving means and said signal outputting means, in response to said stop request signal received by said receiving means.

According to another aspect of the present invention, there is provided an image reading apparatus comprising:

signal generating means for generating a plurality of clock signals having predetermined frequencies different from each other, respectively;

receiving means for receiving a selection signal for representing one clock signal to be selected among said plurality of clock signals, said selection signal being inputted from an external apparatus;

signal selecting means for selecting either one of said plurality of clock signals generated by said signal generating means in response to said selection signal received by said receiving means, and outputting said selected clock signal;

image reading means for reading a document image by scanning said document image in a main scan direction every horizontal scanning line in synchronous with said clock signal outputted from said signal selecting means, and converting said read document image into an image signal;

further signal generating means for generating a horizontal synchronizing signal in synchronous with said clock signal outputted from said signal selecting means; and signal outputting means for outputting said horizontal synchronizing signal and said image signal to an external apparatus.

According to a further aspect of the present invention, there is provided an image reading apparatus comprising:

signal generating means for generating a clock signal having a predetermined frequency, and generating a horizontal synchronizing signal in synchronous with said clock signal;

image reading means for reading a document image by scanning said document image in a main scan direction every horizontal scanning line in synchronous with said clock signal, and converting said read document image into an image signal;

moving means for moving said image reading means and said document image relatively to each other in a sub scan direction perpendicular to said main scan direction at a predetermined moving speed by one horizontal scanning line in synchronous with said clock signal;

signal outputting means for outputting said horizontal synchronizing signal and said image signal to an external apparatus;

receiving means for receiving either one of a high resolution signal for representing that said image signal to be outputted has a predetermined high resolution, and a low resolution signal for representing that said image signal to be outputted has a predetermined low resolution smaller than said predetermined high resolution, said high and low resolution signals being inputted from said external apparatus;

first controlling means for controlling the moving speed of said moving means so that said image signal has said predetermined high resolution, in response to said high resolution signal received by said receiving means; and second controlling means for controlling said signal outputting means so that said image signal has said predetermined low resolution and said horizontal synchronizing signal is thinned out with a ratio corresponding to said predetermined low resolution and is outputted to said external apparatus, in response to said low resolution signal received by said receiving means.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENT

The preferred embodiment according to the present invention will be described below with reference to the attached drawings.

Figure 1:
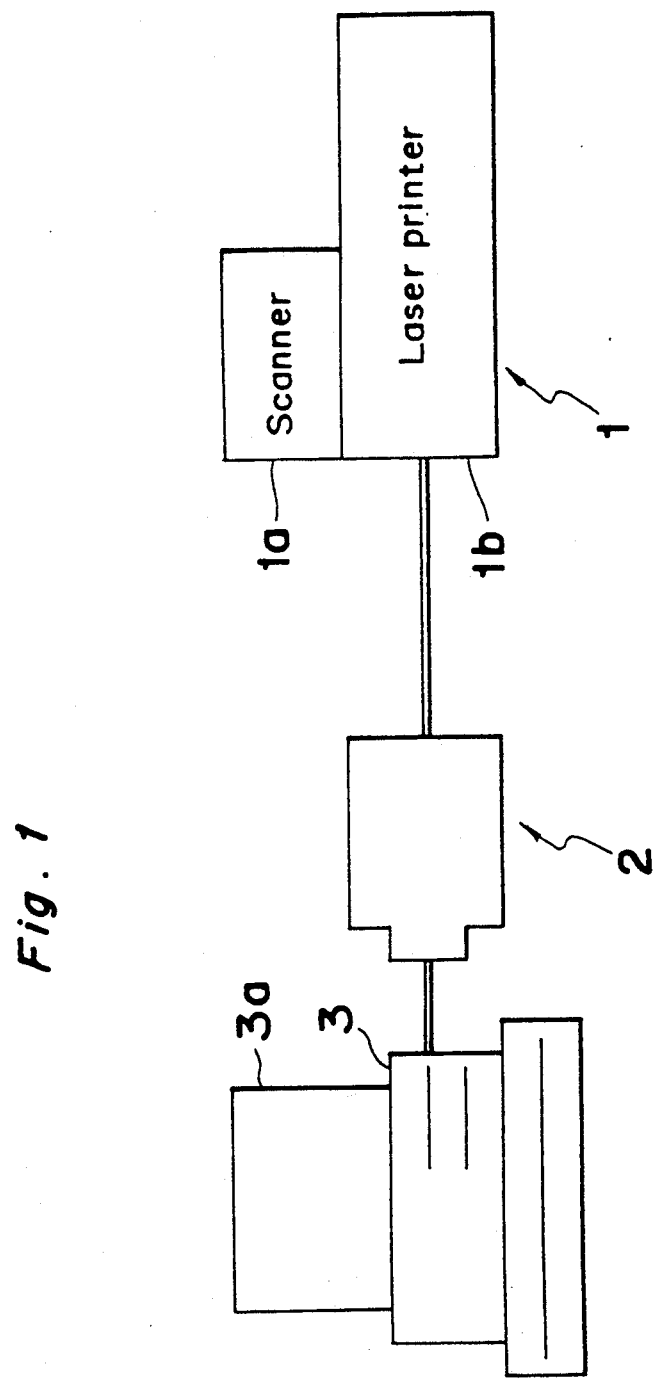
FIG. 1 is a schematic block diagram showing a composition of an image reading system of a preferred embodiment according to the present invention, comprising a scanner printer 1, a controller 2 and an external data processing unit 3.

FIG. 1 shows a composition of an image reading system of a preferred embodiment according to the present invention, comprising a scanner printer 1, a controller 2 and an external data processing unit 3.

Referring to FIG. 1, the scanner printer 1 comprises a scanner 1a for reading image information such as characters, a document image or the like which is typed or printed on a piece of paper, converting the read image information into digital image data and outputting the converted digital image data, and a laser printer 1b for printing an image of a digital image data in response to the inputted digital image data. The external data processing unit 3 is a unit such as a word processor, a personnel computer, a host computer or the like, and is connected through the controller 2 comprising a video interface to the scanner printer 1.

The scanner printer 1 has the following three fundamental operation modes, and operates in either one selected among them.

(a) Scanner mode : A document image is read by the scanner 1a of the scanner printer 1, and the read document image is converted into image data. Thereafter, the converted image data are sent through the video interface of the controller 2 to the external data processing unit 3. Further, the external data processing unit 3, for example, displays an image of the received image data on a CRT display unit 3a connected thereto.

(b) Printer mode : The image of the image data received from the external data processing unit 3 through the video interface of the controller 2 is printed on a piece of paper by the laser printer 1b of the scanner printer 1.

(c) Copier mode : After a document image is read by the scanner 1a and is converted into image data, the laser printer 1b of the scanner printer 1 directly prints the document image of the image data on a piece of paper.

The operation mode of the scanner printer 1 is selectively switched using an operation mode setting key (not shown) provided on an operation panel 4 described in detail later, and is also switched over to either one of the above-mentioned three operation modes based on the command signal from the external data processing unit 3. Namely, the scanner printer 1 can be used as either one of the following units:

(a) a scanner;
(b) a printer; and
(c) a copier.

Figure 2:
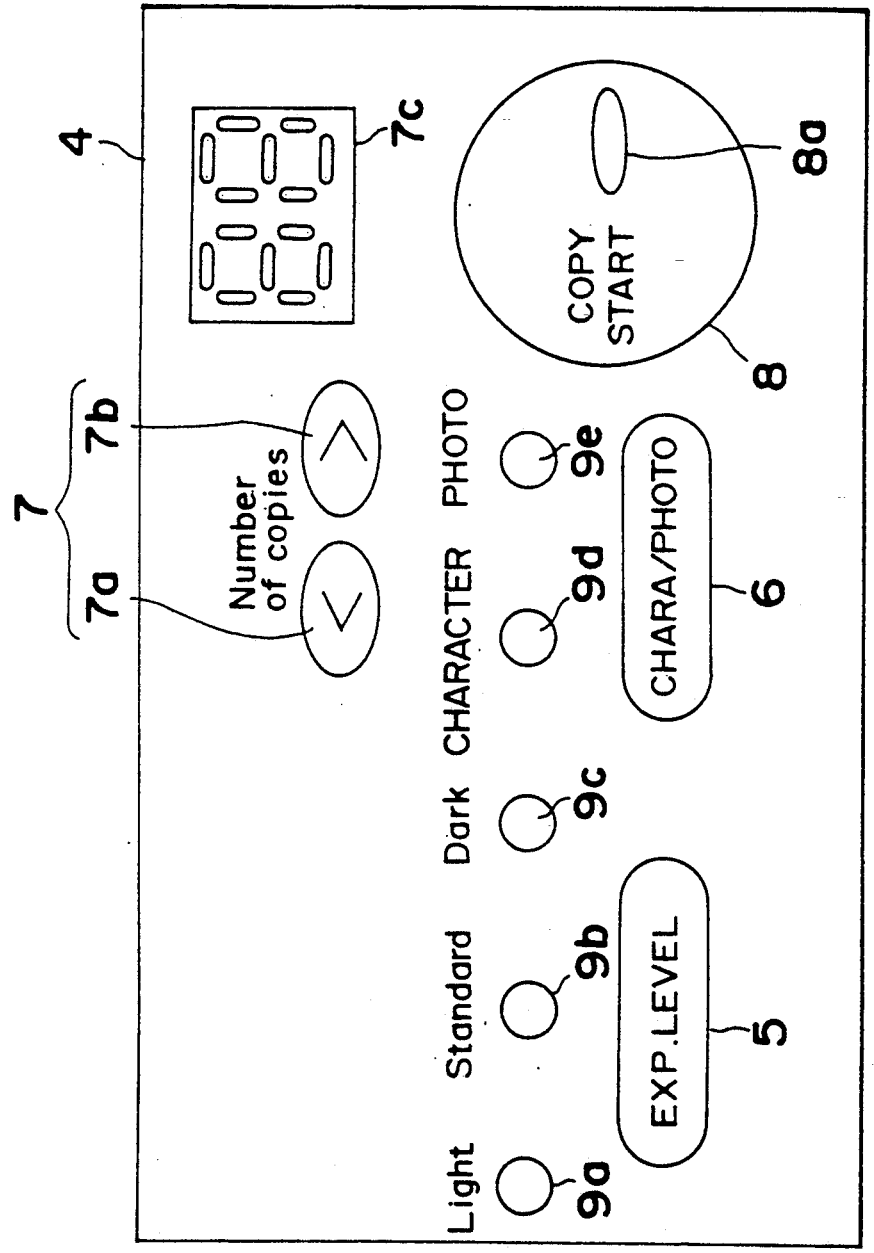
FIG. 2 is an elevational view showing an operation panel 4 of the scanner printer 1 shown in FIG. 1.

Therefore, in order to make the operation upon operating in the copier mode easier, there is provided the operation panel 4 shown in FIG. 2 in the scanner printer 1.

Referring to FIG. 2, there are provided on the operation panel 4, an exposure level key 5 for selectively switching over the exposure level at three stages, and a character/photograph key 6 for selecting either one of a character reading mode for reading a document image including only characters and a photograph reading mode for reading a document image including a photograph image. In the scanner printer 1, a simple binarizing process is performed for the read image data when the character reading mode is set, and an error variance binarizing process is performed for the read image data when the photograph reading mode is set. There is further provided on the operation panel 4, a copy number key 7 for setting a number of copies, which is comprised of an up key 7a and a down key 7b. When the number of copies is set using the copy number key 7, the number of copies is displayed on a light emitting diode display 7c. The light emitting diode is referred to as an LED hereinafter. Furthermore, there is provided on the operation panel 4, a start key 8 for starting a copying operation, and an LED 8a is turned on upon the copying operation. LEDs 9a to 9c are provided for displaying a density set by the exposure level key 5, and LEDs 9d and 9e are provided for displaying the reading mode of either one selected using the character/photograph key 6 among the character reading mode or the photograph reading mode. Further, the operation panel 4 comprises the operation mode setting key (not shown) for selecting either one of the above-mentioned three operation modes.

Figure 3:
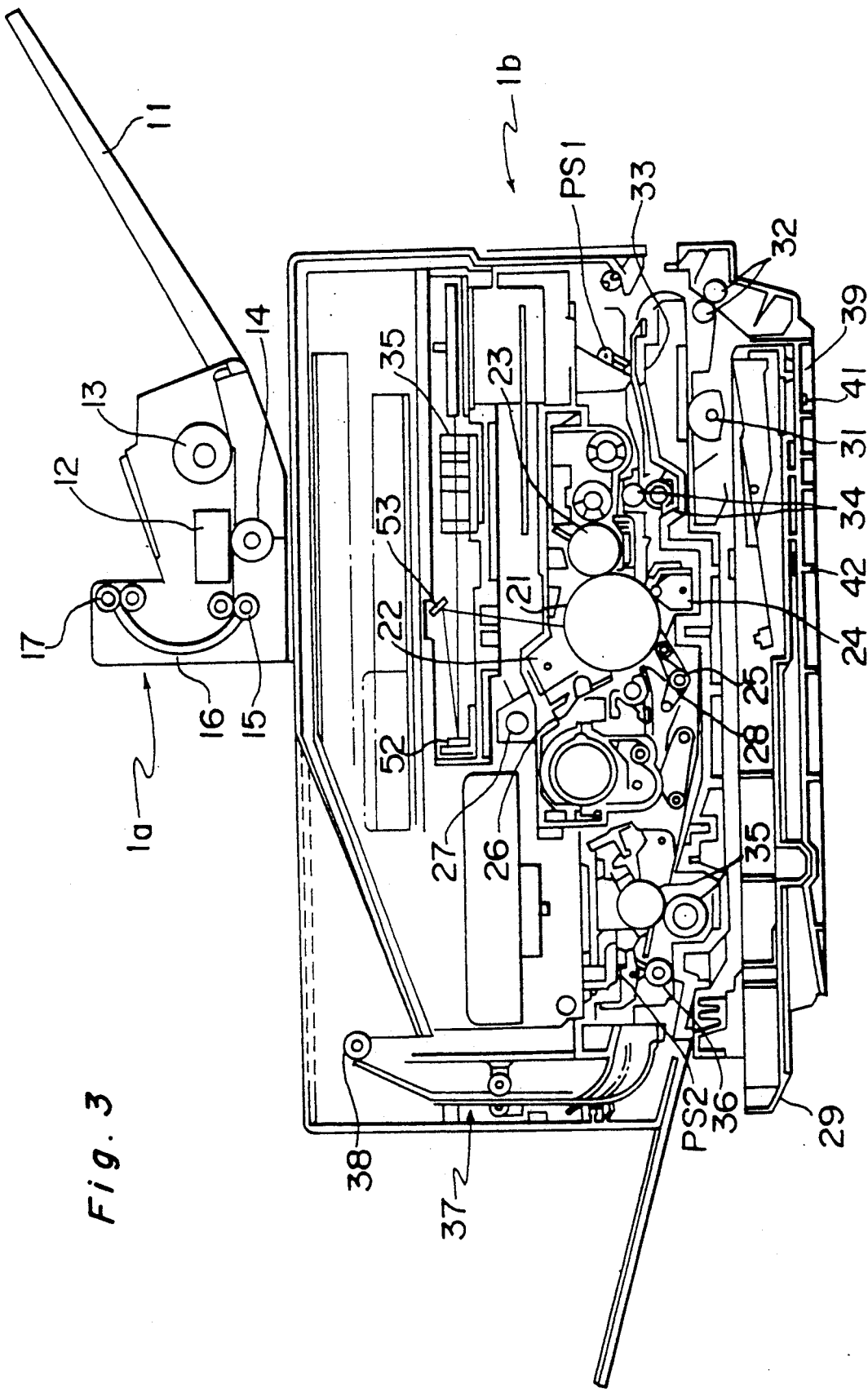
FIG. 3 is a longitudinal cross sectional view showing a structure of the scanner printer 1 shown in FIG. 1.

FIG. 3 shows a structure of the scanner 1a of the scanner printer 1 shown in FIG. 1.

Referring to FIG. 3, the scanner 1a is fixed on the laser printer 1b of the scanner printer 1. The scanner 1a comprises a document tray 11 for setting a number of cut papers and supplying a piece of cut paper, a contact type CCD linear image sensor 12 for reading a document image by scanning it in a main scan direction perpendicular to a direction of supplying the document and for converting the read document image into digital image data, a transfer roller 13 for transferring the document to a predetermined position of the CCD image sensor 12, a resist roller 14 for positioning the document in a reading position in the subscan direction perpendicular to the main scan direction, a discharging roller 15 for discharging the document after reading the document image, a paper discharging path 16 for discharging the document, and a discharging roller 17 for discharging the document.

On the other hand, the laser printer 1b has the following composition below the scanner 1a as shown in FIG. 3. Referring to FIG. 3, a corona charger 22 electrifies a photoconductive drum 21 with a predetermined electric potential prior to projection of a beam of laser light in order to form an electrostatic latent image corresponding to the document image by a beam of laser light. Thereafter, a beam of laser light is projected onto the photoconductive drum 21 so as to form an electrostatic latent image corresponding to the document image thereon, and then, a developing unit 23 develops the formed electrostatic latent image using toner so as to form a toner image on the photoconductive drum 21. Further, after a transfer charger 24 transfers the developed tone image onto a piece of paper, a separation belt 25 separates the paper on which the toner image has been transferred, from the photoconductive drum 21. The toner remaining on the photoconductive drum 21 after transfer of the toner image is collected by a cleaner blade 26. A charge eraser 27 removes the remaining charge from the photoconductive drum 21 in order to uniform charge thereon to be electrified by the corona charger 22. Further, the density of the toner image transferred on the paper is read by a density reader 28, and the toner image to be formed is automatically controlled so as to become a density corresponding to the exposure level set by the exposure level key 5.

The laser printer 1b comprises a paper cassette 29 for accommodating cut papers, a paper feeding roller 31 having a half-moon-shaped cross section for transferring the paper to a paper transfer path, a transfer roller 32, a transfer roller 33 commonly used as a paper supply roller for supplying a piece of paper manually set by an operator, a resist roller 34 for positioning a recording position in a subscan direction (a direction in which a beam of laser light is scanned is referred to as a main scan direction hereinafter, and the direction perpendicular to the main scan direction is referred to as a subscan direction hereinafter), a fixing roller 35 for fixing the toner image transferred by the transfer charger 24 onto the paper, a discharging roller 36 for discharging the paper, a reversing unit 37 for turning over the paper and discharging it so that the back surface thereof becomes the upper surface thereof upon having been discharged, and a discharging roller 38 for discharging the paper. The laser printer 1b further comprises a group of magnets for identifying a size of papers set on the paper cassette 29, and the size of the paper is identified by detecting whether or not one or more magnets are mounted in mounting frames of three bits using a sensor 41. It is to be noted that the presence of the paper within the paper cassette 29 is detected by a paper empty sensor 42, and PS1 and PS2 denote paper sensors for detecting the presence of the papers, respectively.

Figure 4:
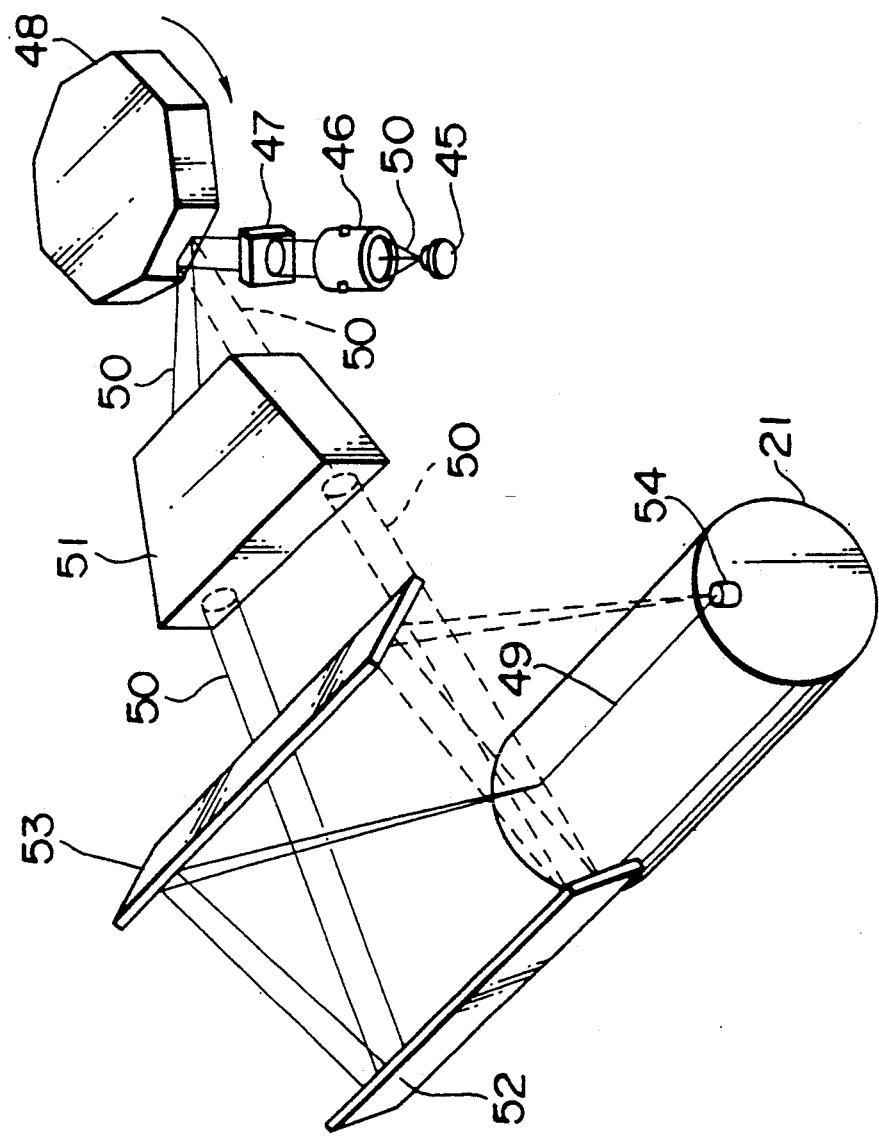
FIG. 4 is a perspective view showing a structure of an optical system of the scanner printer 1 shown in FIG. 1.

FIG. 4 shows a structure of an optical system of the scanner printer 1 shown in FIG. 1.

Referring to FIG. 4, 45 denotes a laser diode (referred to as an LD hereinafter), which is driven by an LD driver 66 shown in FIG. 5. 46 and 47 denote a collimator lens and a cylindrical lens for correcting a spread of the beam of laser light 50 projected from the LD 45. 48 denotes a polygon mirror, by rotation of which a beam of laser light 50 is scanned on the photoconductive drum 21 so as to obtain a scanned light 49. 51 denotes an fθ lens for scanning a beam of laser light on the photoconductive drum 21 in a constant speed, and 52 and 53 denote reflection mirrors for reflecting a beam of laser light into the photoconductive drum 21. 54 denotes a beam detector for detecting a printing position in the main scan direction, and the scanned light 49 is passed through the beam detector 54 and is scanned onto the photoconductive drum 21.

Figure 5:
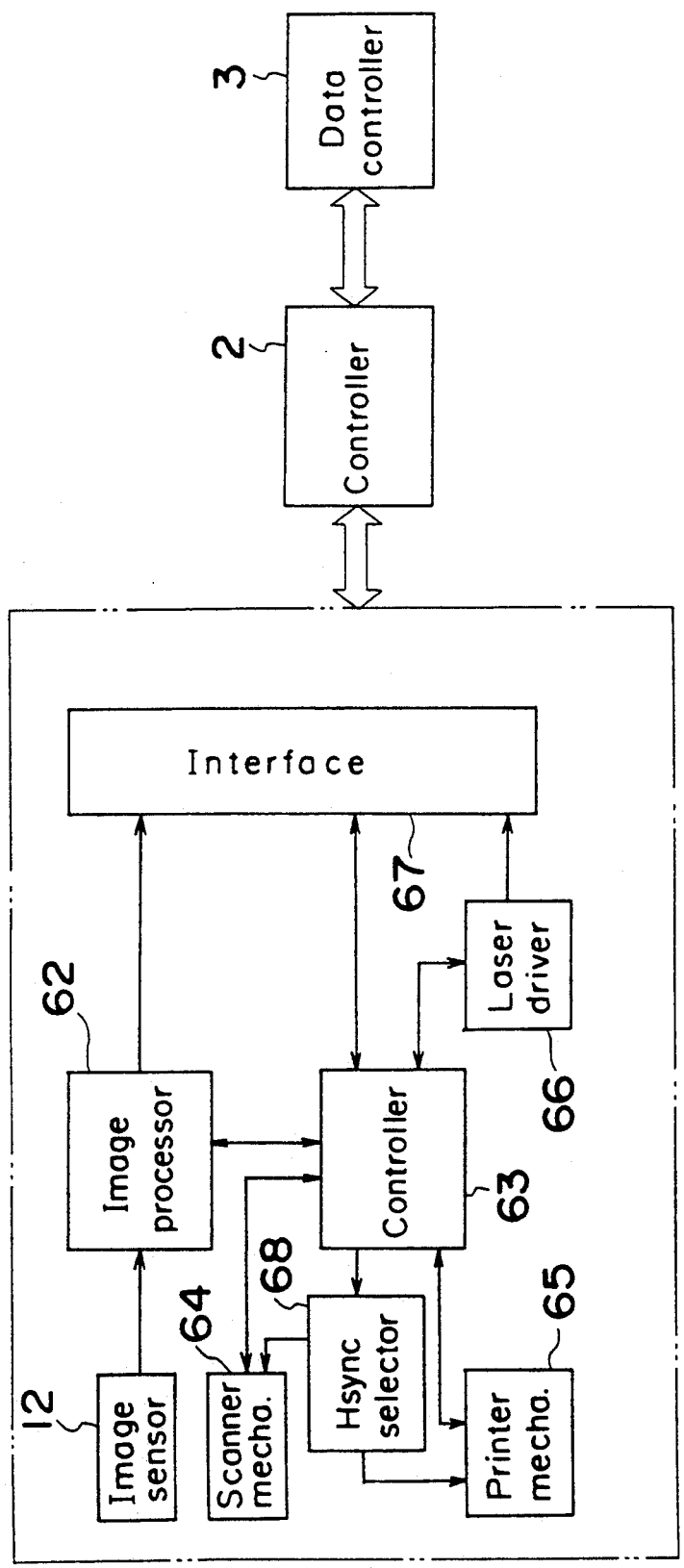
FIG. 5 is a schematic block diagram showing a composition of an electric circuit of the image reading system shown in FIG. 1.

FIG. 5 shows a composition of an electric circuit of the image reading system shown in FIG. 1

Referring to FIG. 5, the scanner printer 1 comprise the CCD linear image sensor 12, an image processor 62, a controller 63, a scanner mechanism 64, a printer mechanism 65, a laser driver 66, an interface 67, and a horizontal synchronizing signal selector (Hsync selector) 68. The respective sections 12, 62 to 68 have the following functions, respectively.

The image sensor 12 reads the document image typed or printed on a piece of document paper and converts the read image into digital image data. The image processor 62 performs a predetermined image process for the image data converted by the image sensor 12, and outputs the digital image data to an output unit such as the laser printer 1b, the display unit 3a of the external data processing unit 3 or the like. The controller 63 controls respective operations of the image processor 62, the scanner mechanism 64, the printer mechanism 65, the laser driver 66 and the interface 67. The scanner mechanism 64 drives the mechanism of the scanner 1a shown in FIG. 1a, and the printer mechanism 65 drives the mechanism of the printer 1b. Further, the laser driver 66 drives the LD 45 according to the inputted digital image data using a so-called intensity modulation method. The interface 67 performs a signal conversion for signals such as command signals from the external data processing unit 3 through the controller 2, image data, control signals or the like. The horizontal synchronizing signal selector 68 selects either one of a plurality of horizontal synchronizing signals for image data to be outputted to the scanner mechanism 64 and the printer mechanism 65, and to be outputted through the controller 2 to the external data processing unit 3, based on the command signal inputted from the external data processing unit 3 through the controller 2 and the interface 67 to the controller 63.

Figure 6:
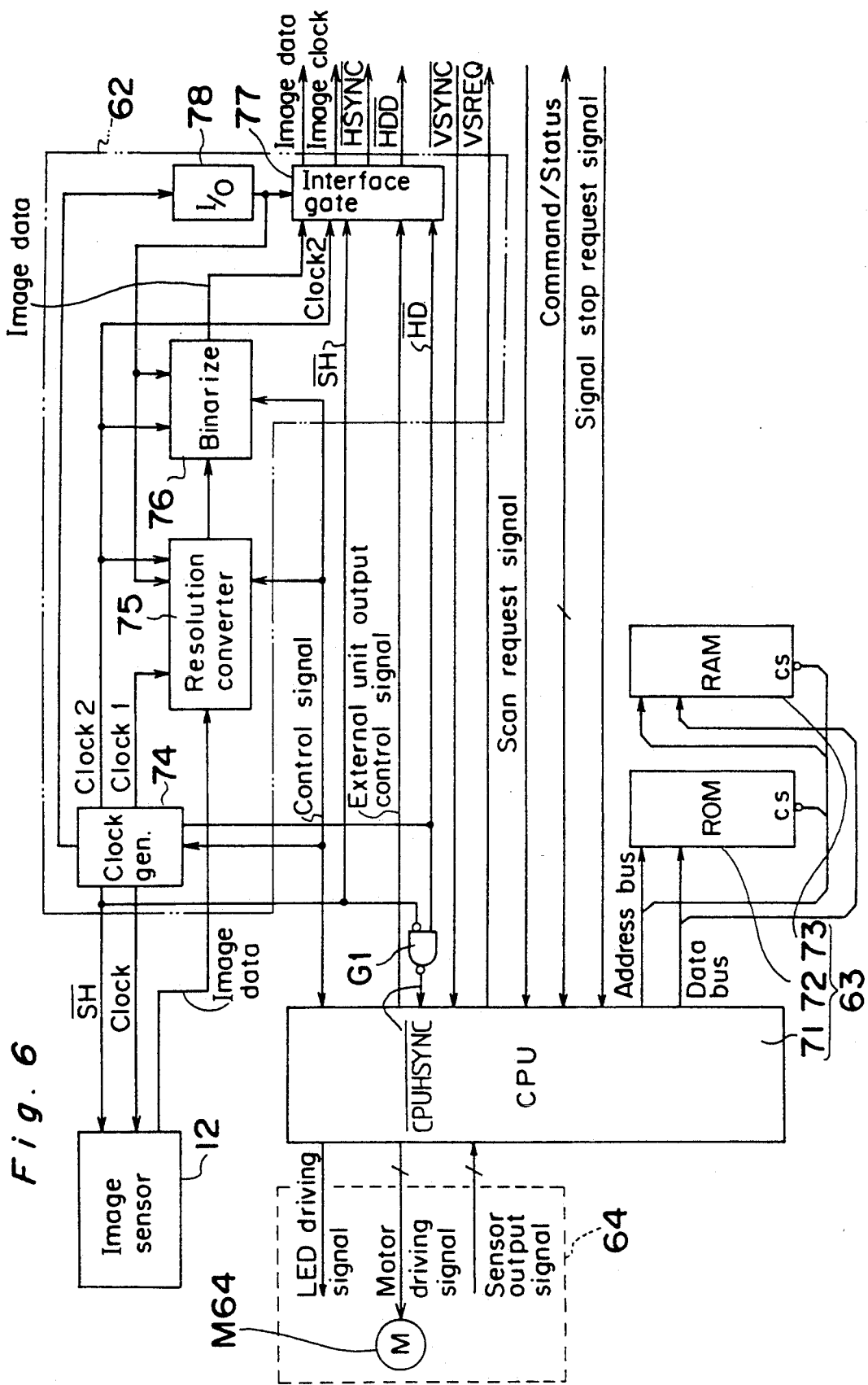
FIG. 6 is a schematic block diagram showing a composition of an electric circuit of the scanner printer 1 shown in FIG. 1.

FIG. 6 shows a composition of an electric circuit of the scanner printer 1 shown in FIG. 1.

Referring to FIG. 6, the controller 63 comprises a CPU 71, a ROM 72 and a RAM 73. The CPU 71 is a processor for sequentially controlling the whole operation of the scanner printer 1, and a control program for execution of the CPU 71 and data required for executing the control program etc. are stored in the ROM 72. Further, the RAM 73 is used as a working area of the CPU 71 for temporarily storing data required upon executing the control program. The CPU 71 generates and outputs an LED driving signal for an LED (not shown) for illuminating the document which is provided within the scanner mechanism 64, and a motor driving signal for driving a stepping motor M64 of so-called pulse motor for transferring the document to the scanner mechanism 64 and moving it in response to driving signals, as described in detail later. On the other hand, the scanner mechanism 64 generates and outputs to the CPU 71 a sensor output signal from a plurality of sensors (not shown) provided therein for detecting the transferred position of the document.

A scan request signal which becomes active when requesting a scan process from the external data processing unit 3 to the scanner mechanism 64 is inputted to the CPU 71, and also an image signal output stop request signal (referred to as a signal stop request signal hereinafter) for stopping output of the image data and stopping rotation of the stepping motor M64 is inputted from the external data processing unit 3 through the controller 2 to the CPU 71 when the operation of the scanner mechanism 64 is to be stopped in the scan process. Further, the external data processing unit 3 generates and outputs the following command signal. The command signal includes information for specifying the resolution (set dpi) of the image data to be outputted, and information for representing the performance such as the frequencies of the respective synchronizing signals and a data processing speed of the external data processing unit 3. On the other hand, the CPU 71 generates and outputs an external unit output control signal for controlling the output of the respective signals including image data, an image clock, a horizontal synchronizing signal $\overline{\text{HSYNC}}$ (referred to as an HSYNC signal hereinafter), and a main scan effect signal $\overline{\text{HD}}$ (referred to as an HD signal hereinafter) etc., to an interface gate circuit 77 of the image processor 62. The CPU 71 further generates and outputs control signals for controlling input and output operations of necessary data to the image processor 62. It is to be noted that overlined signals are signals which become active when they have low levels, respectively.

Referring to FIG. 6, the image processor 62 comprises a clock generator 74, the resolution converter 75, a binarizing section 76, an input and output (I/O) port section 78, and the interface gate circuit 77. The fundamental functions of the sections 74 to 78 will be described below.

The clock generator 74 generates and outputs pixel clocks required in respective sections of the image processor 62 and the CCD image sensor 12. The resolution converter 75 performs an edge emphasis process of 3×3 matrix for the inputted image data, makes line image data of three scanning lines required for the edge emphasis process and the resolution conversion process, converts the image data into image data having a predetermined resolution according to a command signal for specifying an output resolution from the external data processing unit 3, and outputs the image data having the converted resolution. Further, the binarizing section 76 binarizes multi-value image data so as to convert it into binary image data and outputs the binary image data, and the input and output port section 78 sets the input and output of the respective sections of the image processor 62. On the other hand, the interface gate circuit 77 performs a signal conversion process for the image data to be outputted and the respective signals so that the image data and the respective signals become in predetermined forms suitable for that of the external data processing unit 3, and outputs them to the external data processing unit 3.

Figure 7:
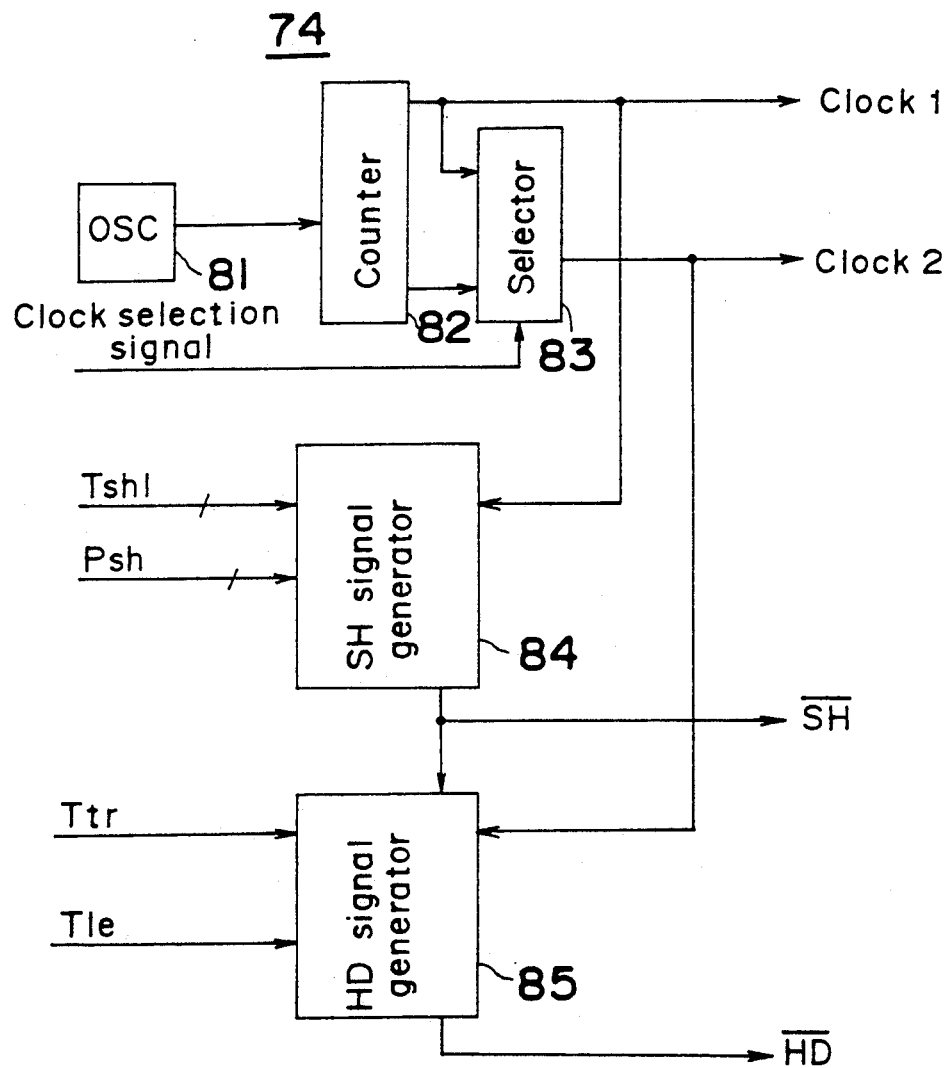
FIG. 7 is a schematic block diagram showing a clock generator 74 shown in FIG. 6.

FIG. 7 shows the clock generator 74 shown in FIG. 6.

Referring to FIG. 7, the clock generator 74 comprises a signal generator 81, a counter 82, a selector 83, an SH signal generator 84, and an HD signal generator 85. The signal generator 81 generates and outputs a clock signal having a predetermined frequency to the counter 82. The counter 82 counts the inputted clock signal, generates a first clock signal having a first frequency by a predetermined first count value, outputs it to the first input terminal of the selector 83, and also outputs it as a clock 1 to the resolution converter 75. Further, the counter 82 generates a second clock signal having a second frequency lower than the first frequency by a predetermined second count value to the second input terminal of the selector 83. Based on the performance of the external data processing unit 3 such as the resolution or the like which is included in the command signal from the external data processing unit 3, the CPU 71 judges whether or either one is to be selected among the first and second clock signals, and outputs a clock selection signal including information of the judgment result to the control signal terminal of the selector 83. Based on the inputted clock selection signal, the selector 83 selects either one of the first and second clock signals, and outputs the selected clock signal as a clock 2.

Figure 8:
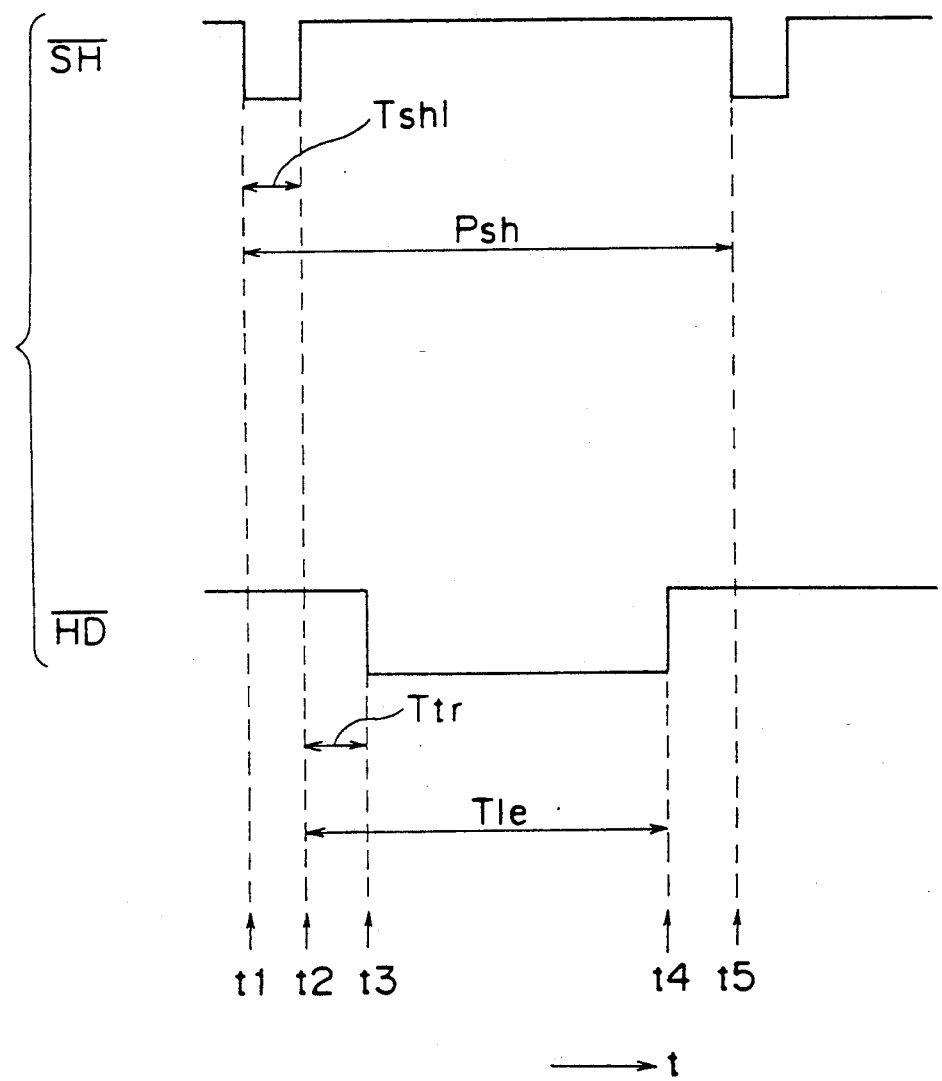
FIG. 8 is a timing chart showing a relationship between an SH signal and an HD signal generated by the clock generator 74 shown in FIG. 7.

Further, the SH signal generator 84 comprises two counters (not shown), generates and outputs a shift signal $\overline{SH}$ (referred to as an SH signal hereinafter) for the CCD linear image sensor 12, as shown in FIG. 8, by counting the clock 1 after setting in one counter data for representing a time interval Tshl when the SH signal has the low level and further setting in another counter data for representing a period Psh of the SH signal.

Further, the HD signal generator 85 comprises two counters (not shown), generates and outputs a main scan direction effect signal $\overline{HD}$ (referred to as an HD signal hereinafter) for representing an effective time interval of the image data in the main scan direction or the horizontal direction of the document, as shown in FIG. 8, by counting the clock 2 after setting in one counter data for representing an time interval Ttr from a leading edge of the SH signal to a trailing edge of the HD signal and setting in another counter data for representing a time interval Tle from a leading edge of the SH signal to a leading edge of the HD signal in a manner to that of the SH signal generator 84. The counter provided in the HD generator 85 is cleared by the SH signal having the low signal when the HD signal has the high level, and is not cleared for a time interval when the HD signal having the low level is outputted.

Figure 9:
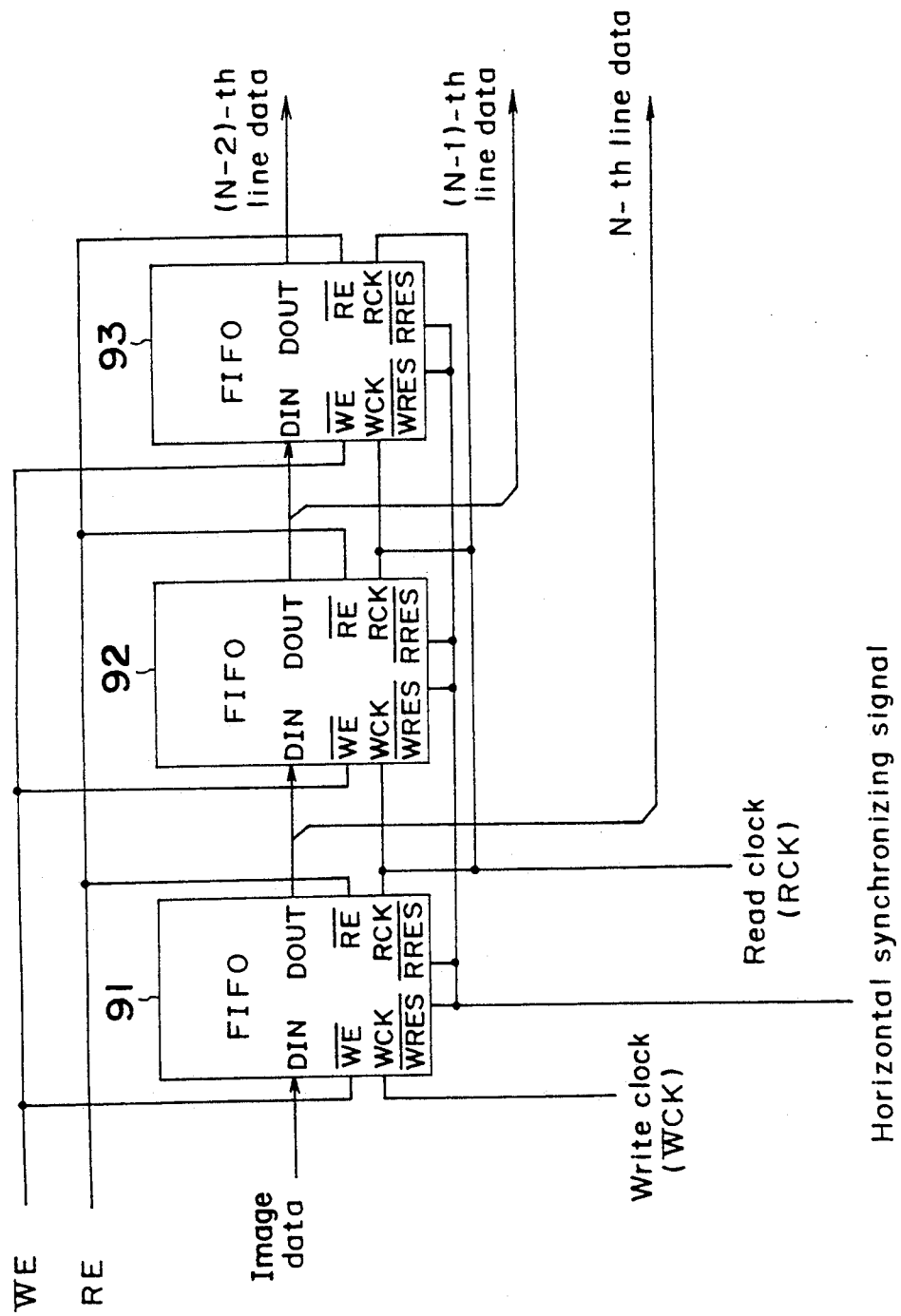
FIG. 9 is a schematic block diagram showing three line buffer memory which is a portion of a resolution converter 75 shown in FIG. 6.

FIG. 9 shows a there line buffer memory which is a portion of a resolution converter 75 shown in FIG. 6.

Referring to FIG. 9, the resolution converter 75 comprises the three line buffer memory including three FIFO memories 91, 92 and 93. The FIFO memories 91 to 93 have the following features as compared with a general static RAM.

(1) It is unnecessary to input address data to each FIFO memory for a write cycle and a read cycle, and each FIFO memory is accessed at a leading edge of a write clock WCK and at a leading edge of a read clock RCK.

(2) The write operation thereof is completely asynchronous with the read operation thereof. Since each memory has dual ports of data input and output terminals DIN (0-7) and DOUT (0-7), the operations of the write and read cycles are performed independent from each other.

(3) Since the address can not be specified to each FIFO memory, only the first-in and first-out operation is performed upon the input and output operations.

(4) IN the internal address pointer, the write address and the read address can be reset to zero, respectively, by making the write reset terminal $\overline{WRES}$ and the read reset terminal $\overline{RRES}$ active.

Figure 10:
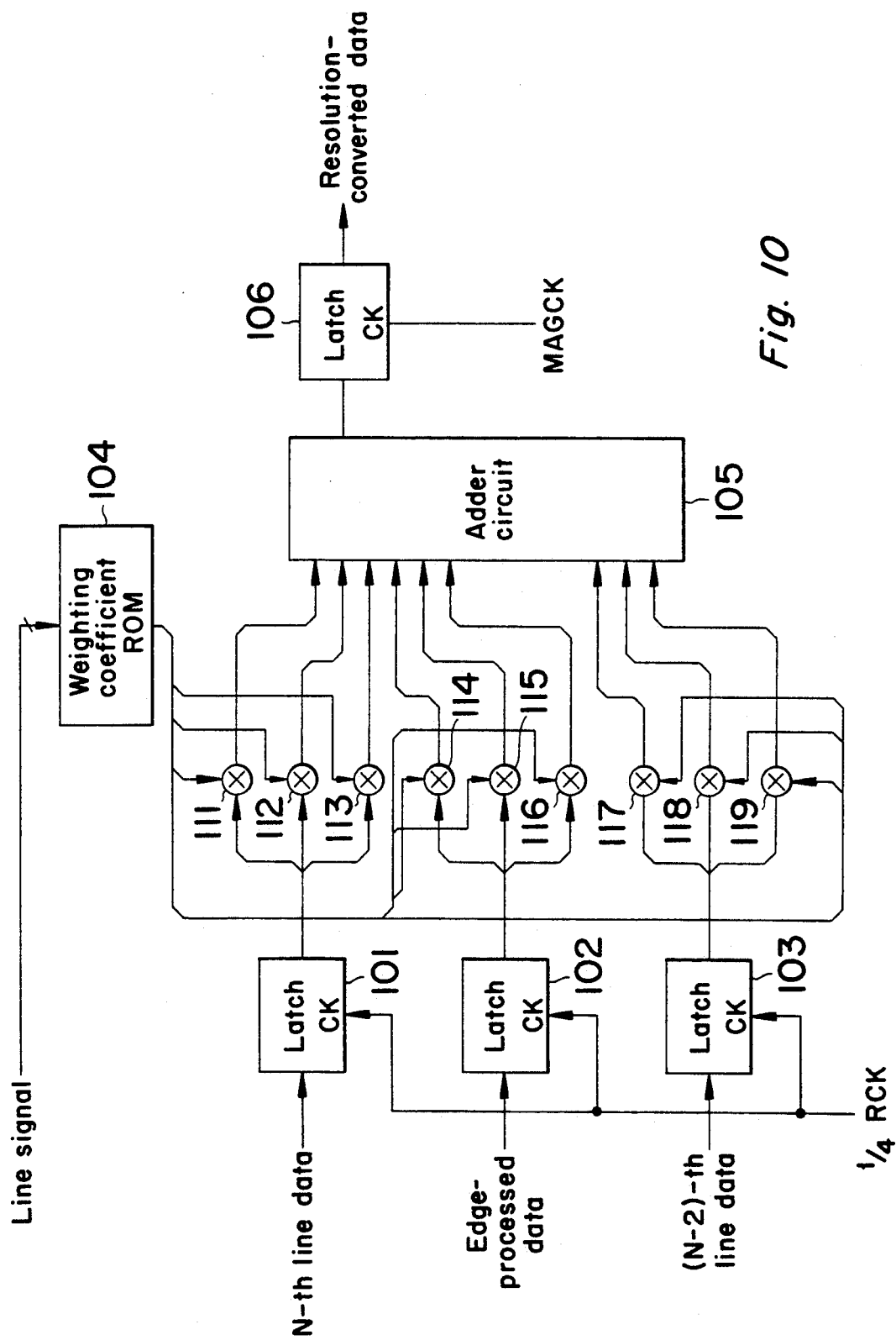
FIG. 10 is a schematic block diagram showing a resolution conversion processor which is a portion of the resolution converter 75 shown in FIG. 6.
Figure 11:
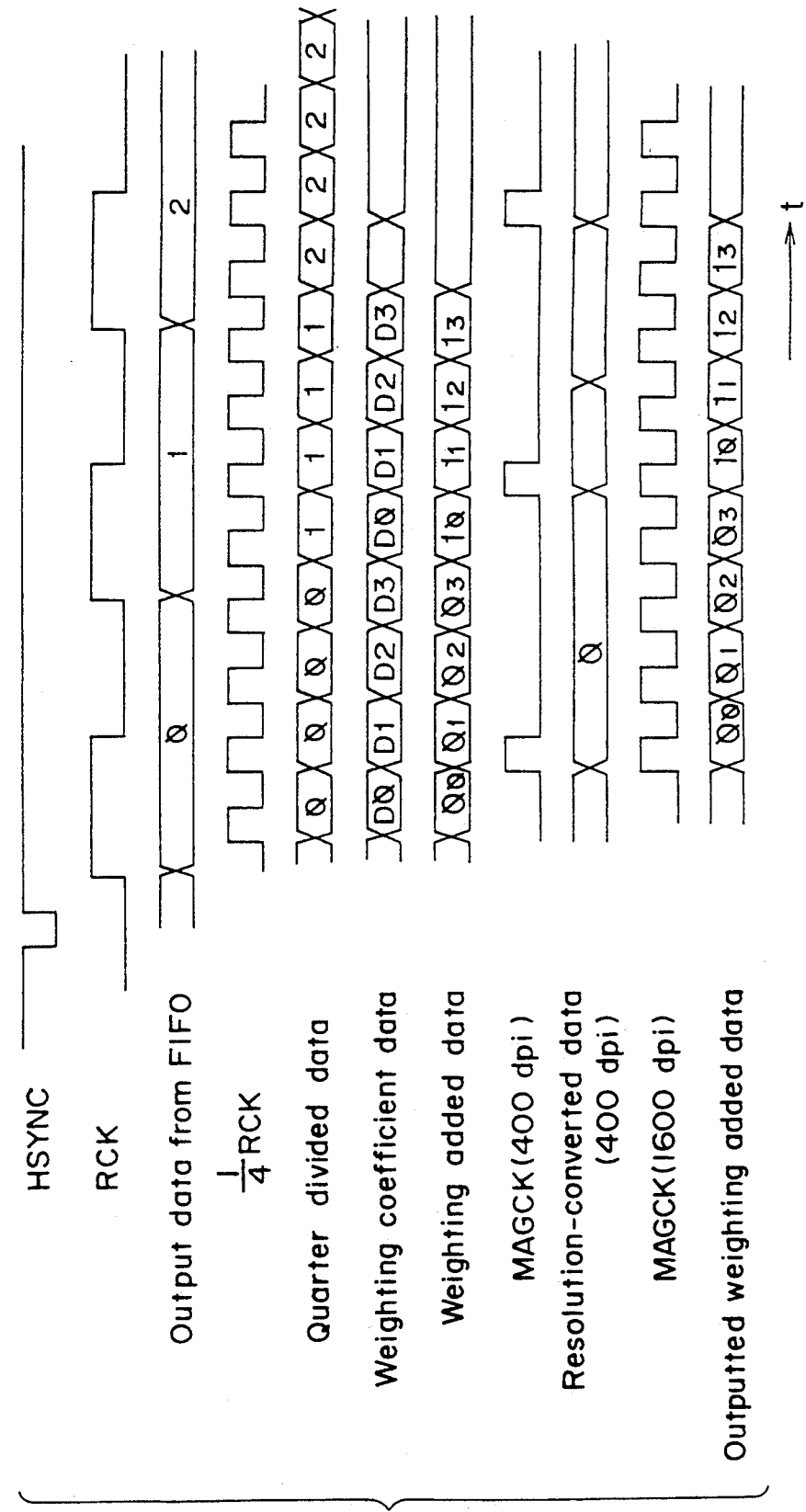
FIG. 11 is a timing chart showing an operation of the resolution conversion processor shown in FIG. 10.

FIG. 10 shows the resolution conversion processor which is a portion of the resolution converter 75 shown in FIG. 6, and FIG. 11 is a timing chart showing an operation of the resolution conversion processor shown in FIG. 10 of the resolution converter 75 shown in FIG. 6. An operation of the resolution converter 75 will be described with reference to FIGS. 9 to 11.

Referring to FIG. 9, first of all, the three line buffer memory comprising the three FIFO memory 91, 92 and 93 converts the inputted image data into respective line image data of three horizontal scanning lines. Thereafter, referring to FIG. 10, the converted line image data of three horizontal scanning lines are latched by three latches 101, 102 and 103 at a timing of a leading edge of a clock ¼RCK having four times the frequency of the read clock RCK so as to divide image data of one pixel into the same four image data in a direction of time axis, resulting in divided image data (referred to as a quarter divided image data hereinafter), as shown in FIG. 11, wherein the Clock ¼RCK is obtained by multiplying the read clock RCK with a multiplication coefficient of four. Then, the quarter divided image data of three scanning lines are multiplied by multipliers 111 to 119 by weighing coefficient data having effects of a smoothing process and an edge emphasis process which have been read out from a ROM 104, and all the image data of the multiplication result are added to each other by an adder circuit 105, resulting in obtaining weighing added image data. Finally, the obtained weighing added image data are latched by a latch 106 according to a clock MAGCK generated by the clock generator 74 wherein the frequency of the clock MAGCK is determined depending on the output resolution, and then, the image data corresponding to the output resolution are outputted from the latch 106.

Figure 12:
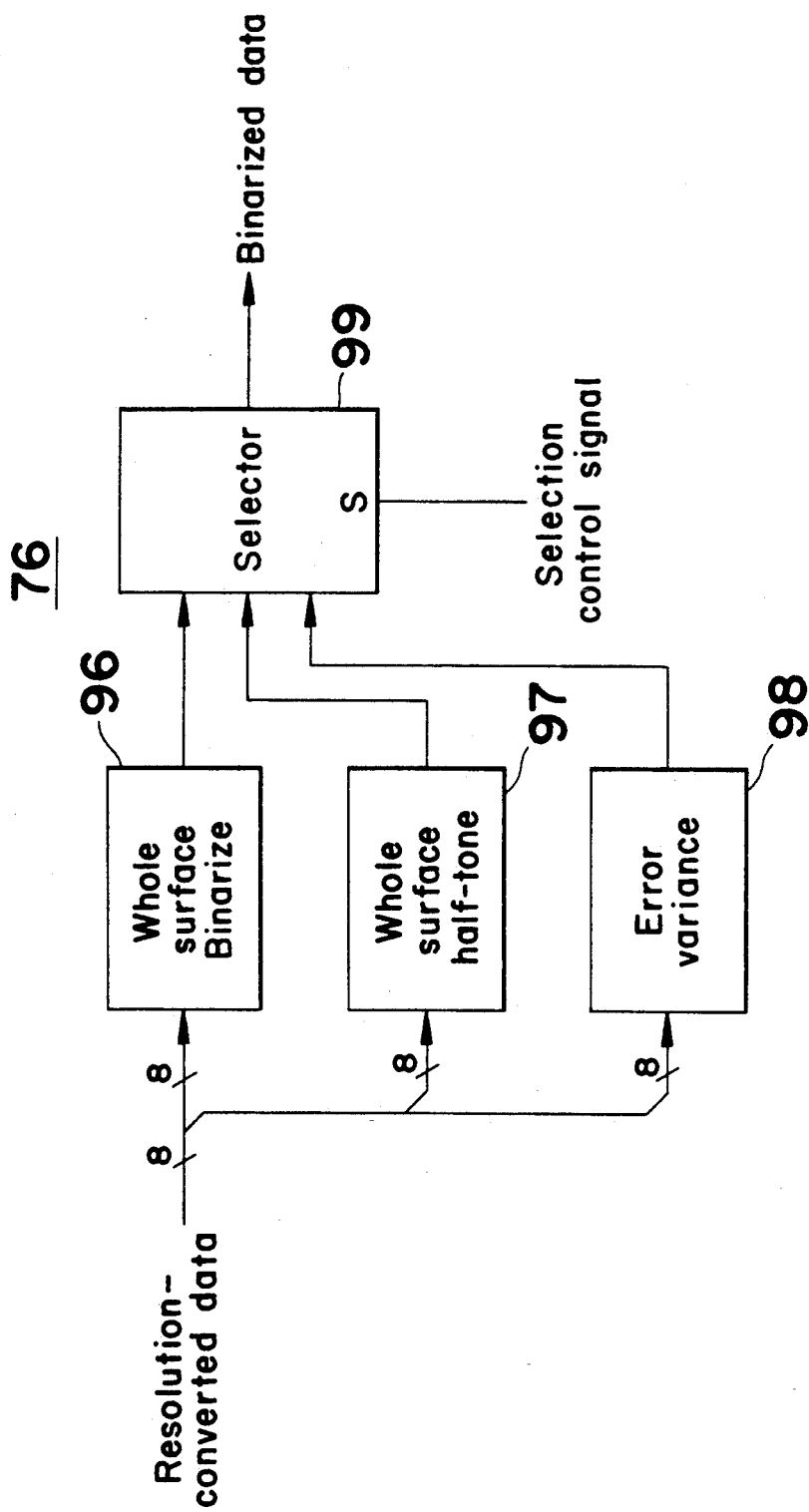
FIG. 12 is a schematic block diagram showing a composition of a binarizing section 76 shown in FIG. 6.

FIG. 12 shows a composition of the binarizing section 76 shown in FIG. 6.

Referring to FIG. 12, the binarizing section 76 comprises a whole surface binarizing section 96 for binarizing all the inputted image data, a whole surface halftone binarizing section 97 for performing a predetermined pseudo half-tone binarizing process for all the inputted image data, an error variance binarizing section 98 for binarizing the inputted image data using an error variance binarizing method, and a selector 99 for selecting either one of the respective binarized image data outputted from the binarizing sections 96, 97 and 98 and outputting the selected image data.

Figure 13:
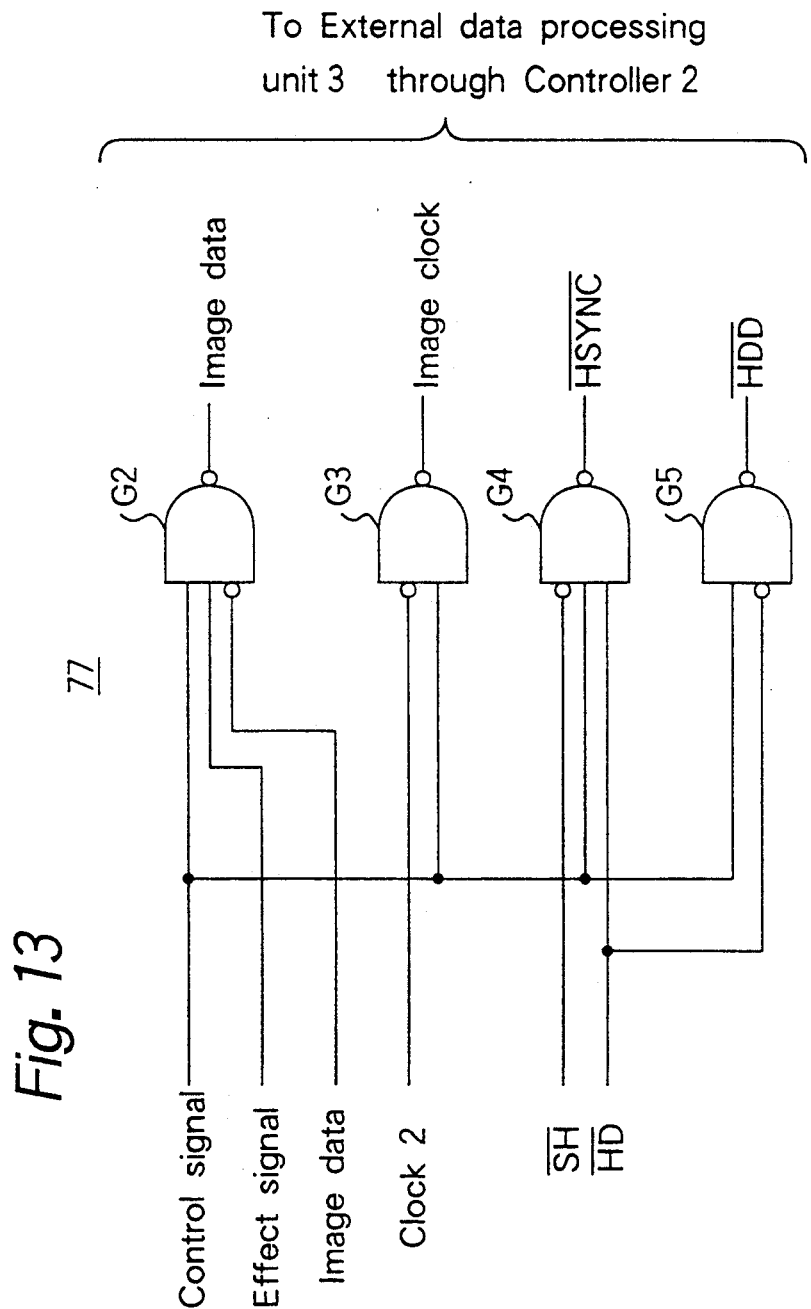
FIG. 13 is a schematic block diagram showing an interface gate circuit 77 shown in FIG. 6.

FIG. 13 shows the interface gate circuit 77 shown in FIG. 6.

Referring to FIG. 13, the interface gate circuit 77 comprises four NAND gates G2, G3, G4 and G5. The control signal from the CPU 71 shown in FIG. 6 is inputted to the first input terminal of the NAND gate G2, the second input terminal of the NAND gate G3, the second input terminal of the NAND gate G4 and the first input terminal of the NAND gate G5. Further, an effect signal from the CPU 71 which will be described in detail later is inputted to the second input terminal of the NAND gate G2, and also the image data are inputted to the third inverted input terminal of the NAND gate G2. Furthermore, the Clock 2 generated by the clock generator 74 is inputted to the first inverted input terminal of the NAND gate G3. The SH signal generated by the SH signal generator 84 is inputted to the first inverted input terminal of the NAND gate G4, and also the HD signal generated by the HD signal generator 85 is inputted to the third input terminal of the NAND gate G4 and the second inverted input terminal of the NAND gate G5. Then, the NAND gates G2, G3, G4 and G5 output image data, the image clock, the HSYNC signal and a main scan effect signal $\overline{\text{HDD}}$ (referred to as an HDD signal hereinafter), respectively, through the controller 2 to the external data processing unit 3. The HDD signal represents an effect time interval of image data within one horizontal scanning line, which are to be outputted from the scanner printer 1.

The above-mentioned respective signals such as the image data, the image clock, the HD signal, the HSYNC signal or the like will be described in detail below.

Clock 1 and Clock 2

The clock 2 is a clock signal selected by the selector 83 from the first clock signal having the same frequency as that of the clock 1 and the second clock signal having the frequency lower than that of the clock 1. The reason why the frequency of the clock can be selected is to solve such a problem that the external data processing unit 3 can not receive and take therein image data in synchronous with the clock 1.

HD signal

The HD signal represents an effect time interval in the horizontal direction of the document or in the main scan direction, and is generated by the HD signal generator 85 based on the two data for representing the above-mentioned time intervals Ttr and Tle which are inputted by the CPU 71. The time interval of the HD signal having the low level is altered depending on the output size or the output time interval in the main scan direction of the image data and output resolution etc.

CPU horizontal synchronizing signal to the CPU 71

A CPU horizontal synchronizing signal $\overline{\text{CPUHSYNC}}$ (referred to as a CPUHSYNC signal hereinafter) generated by the NAND gate G1 and is inputted to the CPU 71 will be described below. Referring back to FIG. 6, the SH signal generated by the clock generator 74 is inputted to the first inverted input terminal of the NAND gate G1, the HD signal generated by the clock generator 74 is inputted to the second input terminal of the NAND gate G1, and then, the NAND gate G1 outputs the CPUHSYNC signal to the CPU 71.

Figure 14A:
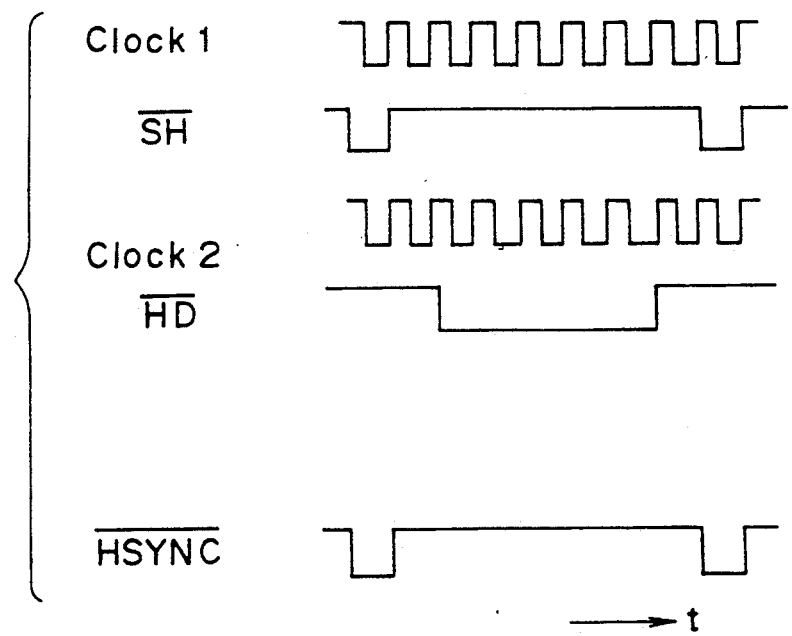
FIG. 14a is a timing chart showing a relationship among a clock 1, a clock 2, the SH signal, the HD signal and an HSYNC signal in the case that the frequency of the clock 1 is the same as that of the clock 2.
Figure 14B:
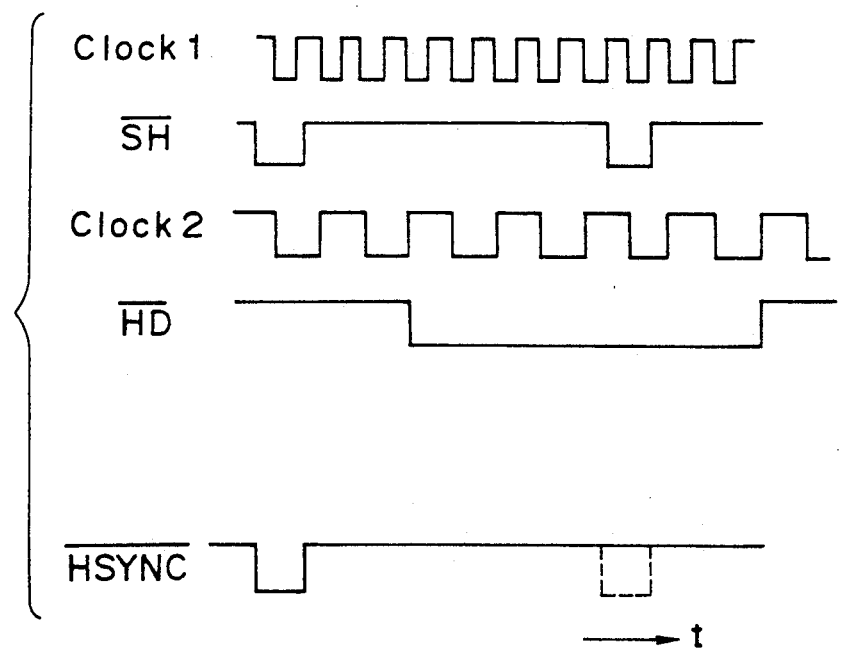
FIG. 14b is a timing chart showing a relationship among the clock 1, the clock 2, the SH signal, the HD signal and an HSYNC signal in the case that the frequency of the clock 1 is different from that of the clock 2.

FIG. 14a is a timing chart showing a relationship among the clock 1, the clock 2, the SH signal, the HD signal and the HSYNC signal in the case that the frequency of the clock 1 is the same as that of the clock 2, and FIG. 14b is a timing chart showing a relationship among the clock 1, the clock 2, the SH signal, the HD signal and an HSYNC signal in the case that the frequency of the clock 1 is different from that of the clock 2.

When the external data processing unit 3 can operate in synchronous with the image clock having the same frequency as that of the clock 1, the SH signal is outputted as it is as the HSYNC signal to the external data processing unit 3, as shown in FIG. 14a. On the other hand, when the external data processing unit 3 can not operate in synchronous with the image clock having the same frequency as that of the clock 1, the SH signal is thinned out by the NAND gate G4 shown in FIG. 13 so as to generate a synchronizing signal having a lower frequency as shown in FIG. 14b, and then, the thinned SH signal is outputted as the HSYNC signal to the external data processing unit 3. Namely, when the HD signal has the low level, the SH signal having the low level is not outputted as shown in a pulse of dotted line of FIG. 14b.

Further, as described in detail below, the CPU 71 drives the stepping motor M64 in synchronous with the CPUHSYNC signal. Therefore, when the clock 2 having the frequency different from that of the clock 1 is selected, the driving speed for the stepping motor M64 can be lowered, and image data can be outputted in synchronous with the image clock to the external data processing unit 3 having a lower receiving or processing speed when receiving image data.

Image data, Image clock, HSYNC signal and HDD signal

When the control signal having the high level controlled and generated in a main routine executed by the controller 63 is inputted to the NAND gates G2 to G5 as shown in FIG. 13, there is prohibited the respective output of the image data, the image clock, the HSYNC signal and the HDD signal from being outputted from the respective NAND gates G2 to G5. It is to be noted that the effect signal inputted to the NAND gate G2 is used for controlling whether the image data are outputted from the image sensor 12 to the external data processing unit 3 as it is or predetermined image data of white pixel are outputted to the external data processing unit 3.

HSYNC signal to External data processing unit 3

The HSYNC signal is a horizontal synchronizing signal generated by the NAND gate G4, as shown in FIG. 13, based on the SH and HD signals generated by the clock generator 74, and the control signal outputted from the CPU 71. As described above, in the case of FIG. 14b, the HSYNC signal is thinned out and is outputted to the external data processing unit 3.

The three operation modes of the scanner mode, the printer mode and the copier mode will be described in detail below.

Scanner mode

Figure 15:
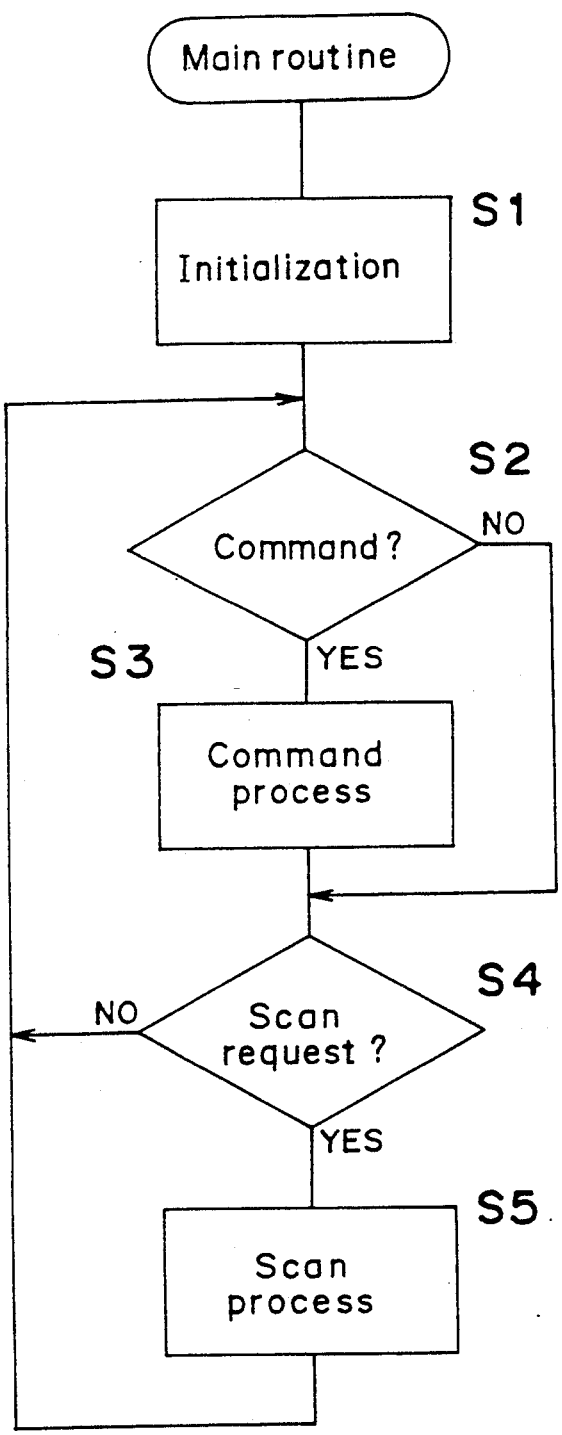
FIG. 15 is a flow chart showing a main routine of a scanner mode executed by a controller 63 shown in FIG. 6.

FIG. 15 is a flow chart showing a main routine of the scanner mode executed by the controller 63 shown in FIG. 6.

Referring to FIG. 15, first of all, at step S1, an initialization process is performed based on information data required for scanning operation such as the output size, the output resolution, the performance of the external data processing unit 3, the exposure level or the like which are included in the command signal sent from the external data processing unit 3. In the initialization process, when the information data can be accepted, a status answer signal of ACKNOWLEDGE is returned to the external data processing unit 3. On the other hand, when the information data can not be accepted, another status answer signal of ABNORMAL is returned to the external data processing unit 3.

After completion of the initialization process, it is judged at step S2 whether or there is the next commend signal from the external data processing unit 3. If there is the command signal (YES at step S2), an analyzing process for the received command signal is performed at step S3, and then, information data required for the scanner operation are taken therein based on the analyzed result and the required process therefor is performed. Thereafter, it is judged at step S4 whether or not there is a scan request based on the scan request signal from the external data processing unit 3. If there is no commend signal (No at step S2), the program flow goes to step S4 without executing the process of step S3.

If there is the scan request from the external data processing unit 3 (YES at step S4), the scan process is executed at step S5, and then, the program flow goes back to step S2. If there is no scan request (NO at step S4), the program flow goes back to step S2.

FIGS. 16 to 19 are flow charts showing the scan process of a subroutine shown in FIG. 15.

Figure 16:
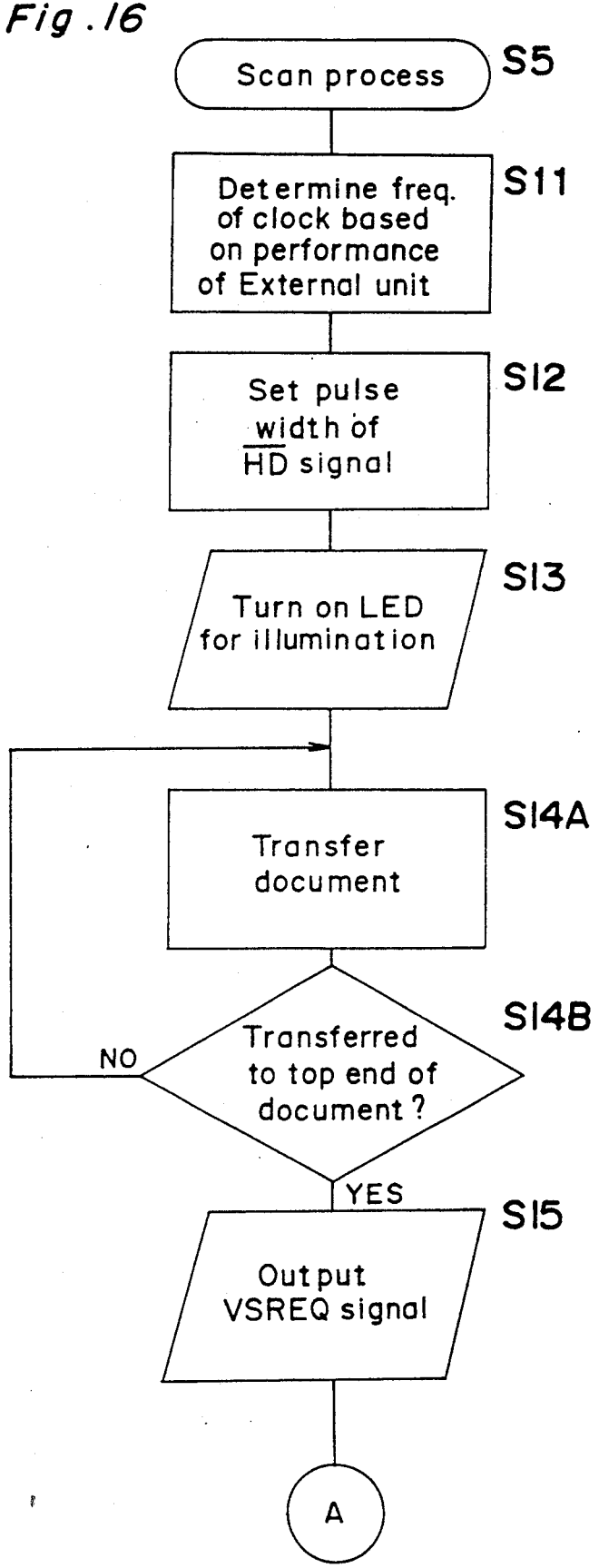
FIGS. 16 to 19 are flow charts showing a scan process of a subroutine shown in FIG. 15.

Referring to FIG. 16, based on the performance of the external data processing unit 3 included in the received command signal from the external data processing unit 3, the frequency of the clock 2 to be generated by the clock generator 74 shown in FIG. 7 is determined at step S11. In the present preferred embodiment, the frequency of the clock 1 is set to 10 MHz, and the frequency of the clock 2 is set to either one selected from frequencies of 10 MHz and 2.5 MHz. The frequency of the clock 2 is selected by the CPU 71 based on the command signal from the external data processing unit 3, and the CPU 71 generates and outputs the clock selection signal for representing the selected frequency of the clock 2. Then, the image data are outputted in synchronous with the image clock of 2.5 MHz to the external data processing unit 3 which can not receive the image data in synchronous with the image clock of 10 MHz.

In the present preferred embodiment, there is disclosed the selection of the image clock for selecting either one clock from two clocks having the frequency different from each other, however, the present invention is not limited to this. Either one clock may be selected from three or more clocks having the frequency different from each other.

Thereafter, after setting at step S12 the pulse width of the HD signal or the time interval data Ttr and Tle for the count values of the counters of the HD signal generator 85 according to the output size of the image data or the effect time interval in the main scan direction of the image data, these data are outputted from the CPU 71 to the HD signal generator 85, and then, the LED for illuminating the document is turned on at step S13.

In this state, the stepping motor M64 is driven at step S14A so that the document set on the document tray 11 is started to be transferred to the CCD image sensor 12, and then, it is judged at step S14B whether or not the document has been transferred to the predetermined position of the CCD image sensor 12. If it is judged that the top end of the document has reached the predetermined position of the CCD image sensor 12 (YES at step S14B), a vertical start request signal VSREQ (referred to as a VSREQ signal hereinafter) for representing that the top end of the document has reached the CCD image sensor 12 so that the document image can be read by the CCD image sensor 12 and that it is now an effect time interval of the image data in the subscan direction is outputted to the external data processing unit 3 at step S15, and then, the program flow goes to step S16. On the other hand, if the top end of the document has not reached the CCD image sensor 12 (NO at step S14B), the program flow goes back to step S14A, and then, the document continues to be transferred toward the CCD image sensor 12 in the subscan direction.

Figure 20:
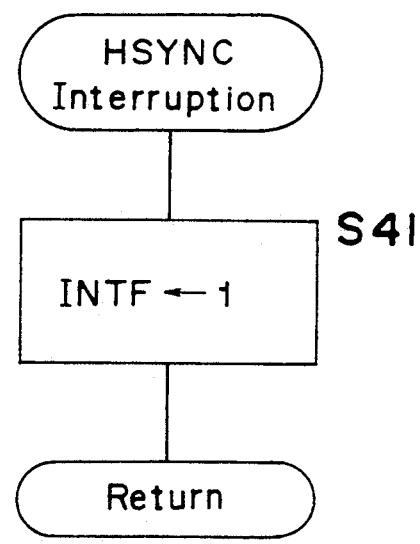
FIG. 20 is a flow chart showing an HSYNC interruption process executed by the controller 63 shown in FIG. 6.

At step S16 of FIG. 17, the CPU 71 waits for a vertical synchronizing signal $\overline{\text{VSYNC}}$ (referred to as a VSYNC signal hereinafter) for representing that the external data processing unit 3 requests the scanner printer 1 to output image data and is taking therein image data at present or is receiving them, which is inputted from the external data processing unit 3. If it is judged that the VSYNC signal has been received (YES at step S16), the process of step S17 is executed. Thereafter, the CPU 71 waits for the CPUHSYNC signal having the low level from the NAND gate G1. When the CPUHSYNC signal is inputted to the CPU 71, an HSYNC interruption process is executed shown in FIG. 20, and then, an interruption flag INTF is set to one. Thereafter, the program flow goes back to the scan process routine shown in FIG. 17. Then, if it is judged at step S17 based on the interruption flag INTF that the CPUHSYNC signal has been inputted (YES at step S17), the interruption flag INTF is reset to zero, and then, it is judged at step S20 whether or not the CPU 71 has received the signal stop request signal from the external data processing unit 3.

If the signal stop request signal has been received from the external data processing unit 3 (YES at step S20), the output of the image data is stopped at step S19, the motor driving signal is turned off so that rotation of the stepping motor M64 is stopped, and then, the program flow goes back to step S17. The signal stop request signal represents requesting the scanner printer 1 to stop the output of the image data after the external data processing unit 3 can not receive the image data.

On the other hand, if the signal stop request signal has not been received (NO at step S20), it is checked at step S21 whether or not the read image data of one horizontal scanning line are to be outputted based on the output resolution of the image data to be outputted. Namely, when the resolution in the subscan direction is lower than 400 dpi, the resolution of the image data in the subscan direction is decreased by thinning out the line image data of horizontal scanning line. The judgment process of step S21 will be described in detail later.

The process of the resolution conversion process including a high resolution conversion process for converting image data into image data having a higher resolution of, for example, 800 dpi and a low resolution conversion process for converting image data into image data having a lower resolution of, for example, 200 dpi will described in detail below.

(1) High resolution conversion process: Image data of sequential three scanning lines on the document are written in the three FIFO memories 91, 92 and 93 shown in FIG. 9, and then, there is generated the image data of three scanning lines. Thereafter, each of generated image data of one scanning line are further divided into image data of four divided lines, and each of the divided image data of four divided lines are processed in a manner depending on the respective divided lines. Therefore, the stepping motor M64 is stopped until the image data process for the image data of the respective divided lines has been completed.

(2) Low resolution conversion process: Image data of sequential three scanning lines on the document are written in the FIFO memories 91, 92 and 93, however, the low resolution conversion process is performed by fundamentally thinning out the HSYNC signal and the image data in a unit of the scanning line. Therefore, the stepping motor M64 is driven, however, the HSYNC signal and the image data are thinned out so that the image data of scanning line to be removed is prohibited from being outputted.

As described above, when the read image data of scanning line is not to be outputted (NO at step S21), the control signal having the low level is outputted so that the output of the image data is prohibited at step S22. On the other hand, when the read image data of scanning line is to be outputted (YES at step S21), the control signal having the high level is outputted so as to permit the image data to be outputted at step S23, and then, the program flow goes to step S24 of FIG. 18.

Figure 18:
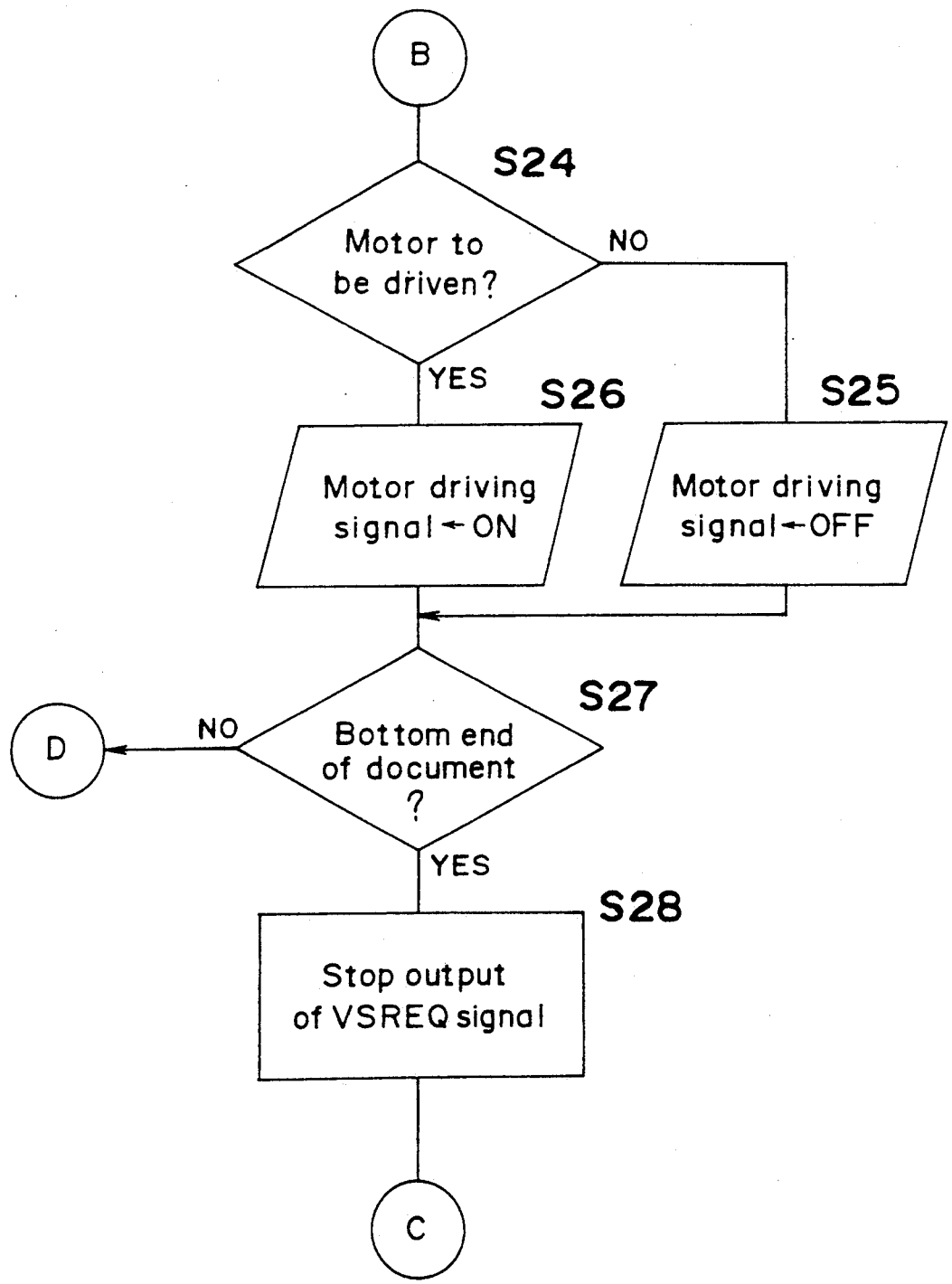

It is judged at step S24 of FIG. 18 based on the output resolution of the image data to be outputted whether or not the stepping motor M64 is to be driven. Namely, when the resolution specified by the external data processing unit 3 (referred to as a set resolution or a set dpi hereinafter) is higher than 400 dpi, the same image data of scanning line are outputted a plurality of number of times in such a state that the stepping motor M64 is stopped, thereby increasing the quantity of image data. The process of step S24 will be described in detail later.

If it is judged at step S25 that the stepping motor M64 is not to be driven (NO step S25), the motor driving signal is turned off at step S25, so that the stepping motor M64 is stopped. On the other hand, if it is judged at step S24 that the stepping motor M64 is to be driven (YES at step S24), the motor driving signal is turned on at step S26 so that the stepping motor M64 is rotated by one step and the document is moved in the subscan direction by one scanning line.

After completion of step S25 or S26, it is checked at step S27 whether or not the bottom end of the document has reached the predetermined position of the CCD image sensor 12. If the bottom end of the document has not reached there (NO step S27), the program flow goes back to step S17 of FIG. 17.

Figure 19:
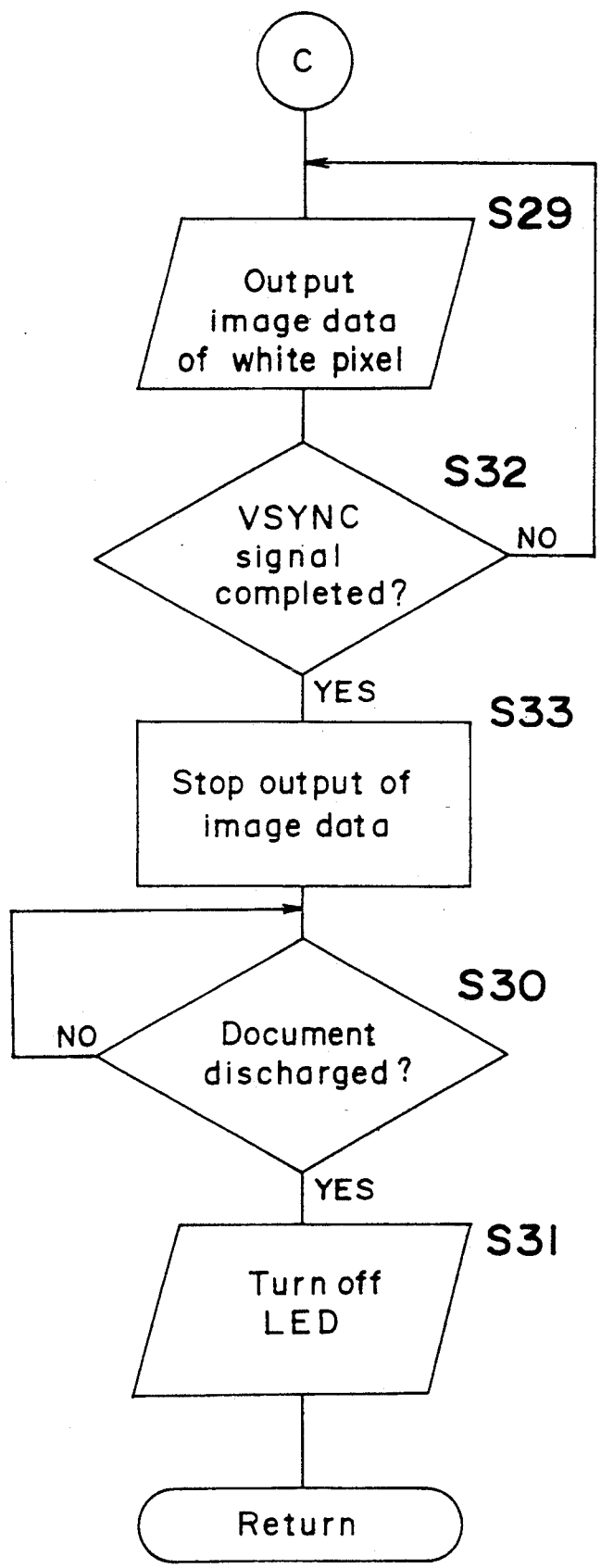

On the other hand, if it is judged that the bottom end of the document has reached the predetermined position of the CCD image sensor 12 (YES at step S27), the output of the VSREQ signal is stopped at step S28, image data of white pixel are outputted at step S29 of FIG. 19, and then, the program flow goes to step S32. These steps S27 to S32 are provided for checking whether or not the external data processing unit 3 is receiving and taking therein the image data and then for sending the image data white pixel when the data processing unit 3 receives and takes therein the image data. This process is provided in order to prevent such a phenomenon that there is caused a system down of the image reading system since a quantity of the image data from which the scanner printer 1 outputs is different from that of image data which the external data processing unit 3 request the scanner printer 1 to output, such as such a state that the external data processing unit 3 permanently waits for the image data, or in order to remove a process of the external data processing unit 3 of generating image data by itself corresponding to the quantity of image data requested by the external data processing unit 3 and adding image data of insufficient lines to the received image data.

In the present preferred embodiment, since the image data to be outputted are positive image data, the image data of white pixel are outputted at step S29. However, the present invention is not limited to this. When the image data to be outputted is negative image data, image data of black pixel may be outputted at step S29.

After completion of the process of step S29 of FIG. 19, it is judged at step S32 whether or not the VSYNC signal has been completed. If it is judged that the VSYNC signal has been completed (YES at step S32), the output of the image data is stopped, and then, the program flow goes to step S30. On the other hand, if the VSYNC signal has not been completed (NO step S32), the program flow goes to step S29. After the output of the image data is stopped at step S30 of FIG. 19, it is judged at step S30 whether or not the document has been discharged. If the document has been discharged (YES at step S30), the LED for illuminating the document is turned off at step S31, and then, the process of the scanner mode is completed.

The resolution conversion process described in the process of the scanner mode will be described in detail below.

Figure 23:
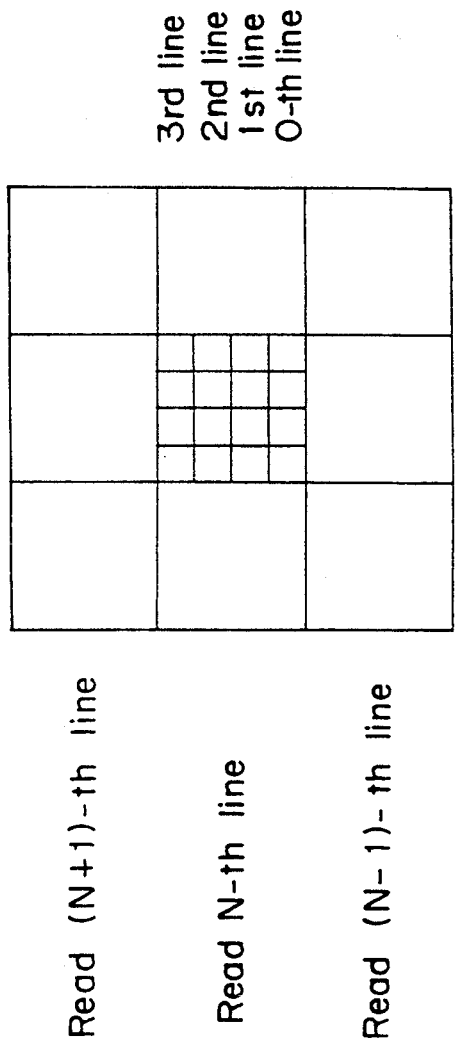
FIG. 23 is an elevational view of respective read horizontal scanning lines and respective converted pixels on the horizontal scanning lines, showing a process of a resolution conversion process executed by the resolution converter 75 shown in FIG. 6.

If the signal stop request signal has not been received from the external data processing unit 3 at step S20, the program flow goes to step S21, the line number to be processed is determined upon processing the image data of one scanning line which are being read at present, and then, the image processing method is altered depending on the determined line number. Namely, as shown in FIG. 23, in the process for, for example, read image data of N-th line, the image processing method for respective image data of respective divided 0-th to third lines is altered by changing a feed back method for feeding back the image data of one line to be outputted to the external data processing unit 3, wherein N is an integer. Namely, the weighing coefficients for the image data of (N−1)-th line and the image data of N-th line to be added to the image data of the 0-th line are set to be larger than that for the image data of (N+1)-th line, and the weighing coefficients for the image data (N+1)-th line, and the weighing coefficients for line to be added to the image data of the third line are set to be larger than that for the image data of (N−1)-th line.

A method of the resolution conversion process will be described in detail below with reference to FIG. 21. In the resolution conversion process, "outputline" is used as a parameter of a line number to be processed and outputted, and "dpinum" is used as a resolution parameter for judging whether or not the image data are to be outputted.

In the present preferred embodiment, the reading resolution of the scanner 1a of the scanner printer 1 is 400 dpi, and the scanner printer 1 has the maximum output resolution of 1600 dpi which is four times the reading resolution of 400 dpi. Therefore, the scanner printer 1 is constituted so that the scanner printer 1 can repeatedly output the image data of one scanning line four times in response to the read image data of one scanning line. Further, in order to change the output resolution in a unit of 1 dpi, "dpinum" is used as a resolution parameter as described in detail below.

Figure 17:
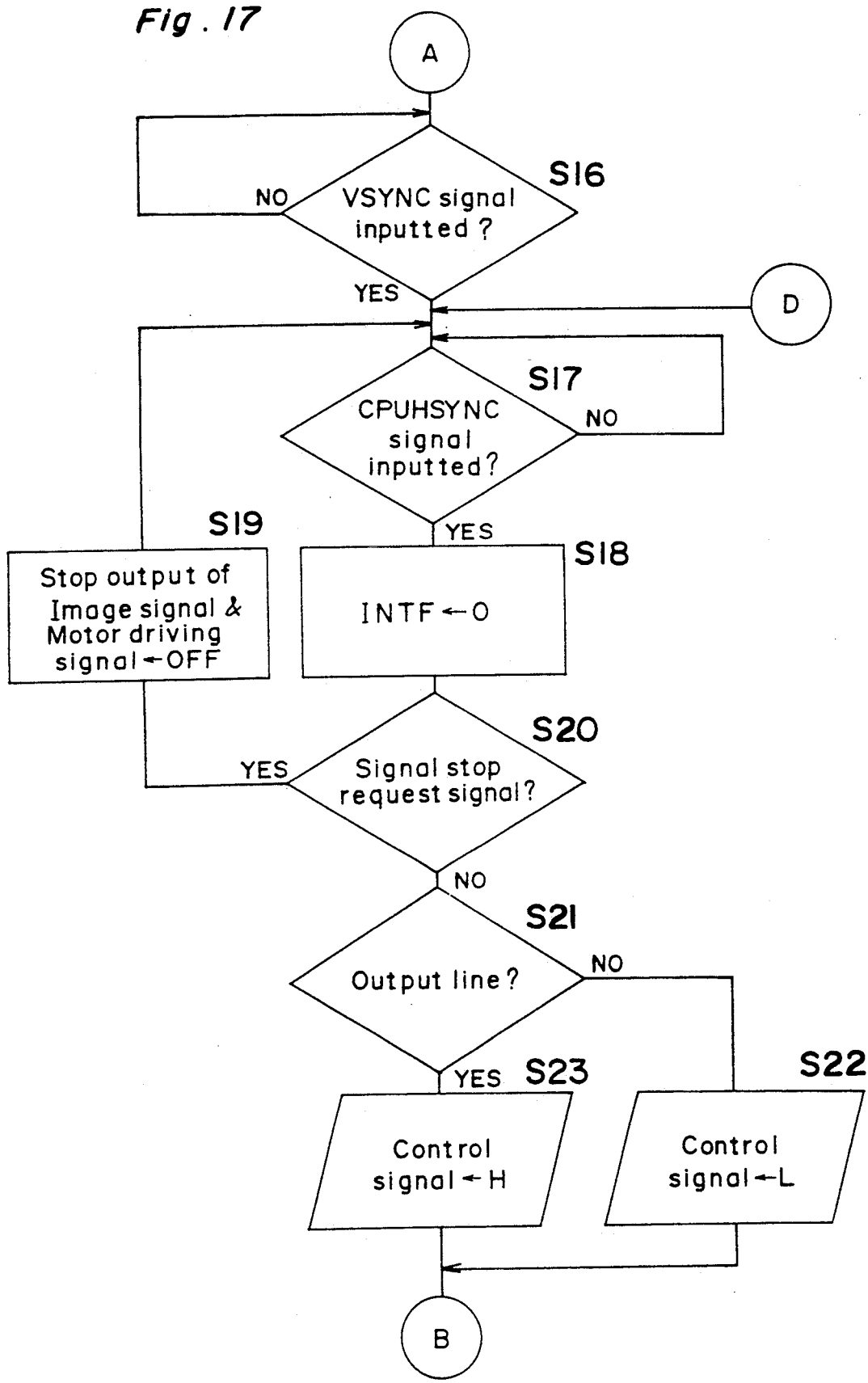
Figure 21:
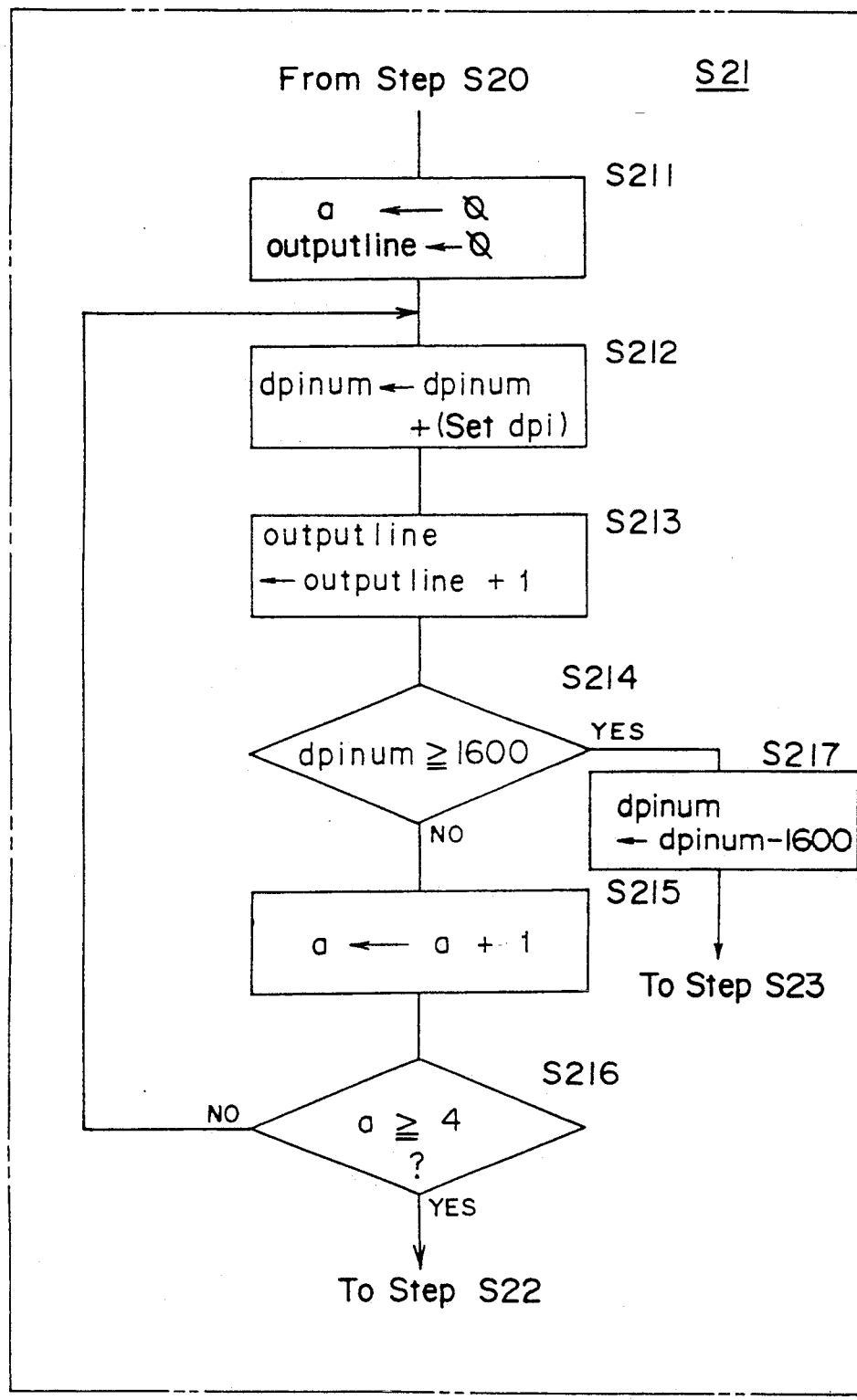
FIG. 21 is a flow chart showing details of a process of step S21 shown in FIG. 17.

FIG. 21 is a flow chart showing details of a process of step S21 shown in FIG. 17.

Referring to FIG. 21, first of all, both of a processing parameter "a" and the output line parameter "outputline" are reset to zero at step S211, and the set dpi specified by the command signal from the external data processing unit 3 is added to the resolution parameter "dpinum" every one scanning line at step S212. Then, these process of steps S212 to S216 is repeated a natural number of times equal to or smaller than four. If the resolution parameter "dpinum" becomes equal to or larger than 1600 (YES at step S214), the output of the image data is permitted, and then, 1600 is subtracted from the resolution parameter "dpinum" and the difference therebetween of the subtracted result is set as the resolution parameter "dpinum" at step S217. Thereafter, the program flow goes to step S23, and then, the process with respect to the image data of reading line has been completed. If the process of step S212 to S214 has been repeated four times (YES at step S216), the program flow goes to step S22. It is to be noted that the resolution parameter "dpinum" used at step S212 is initialized to zero at step S15 of FIG. 15.

Further, the timing of the stop of the stepping motor M64 is determined as follows. At step S211, the output line parameter "outputline" is reset to zero, and one is added to the parameter "outputline" at step S213 every execution of the process of step S212.

Figure 22:
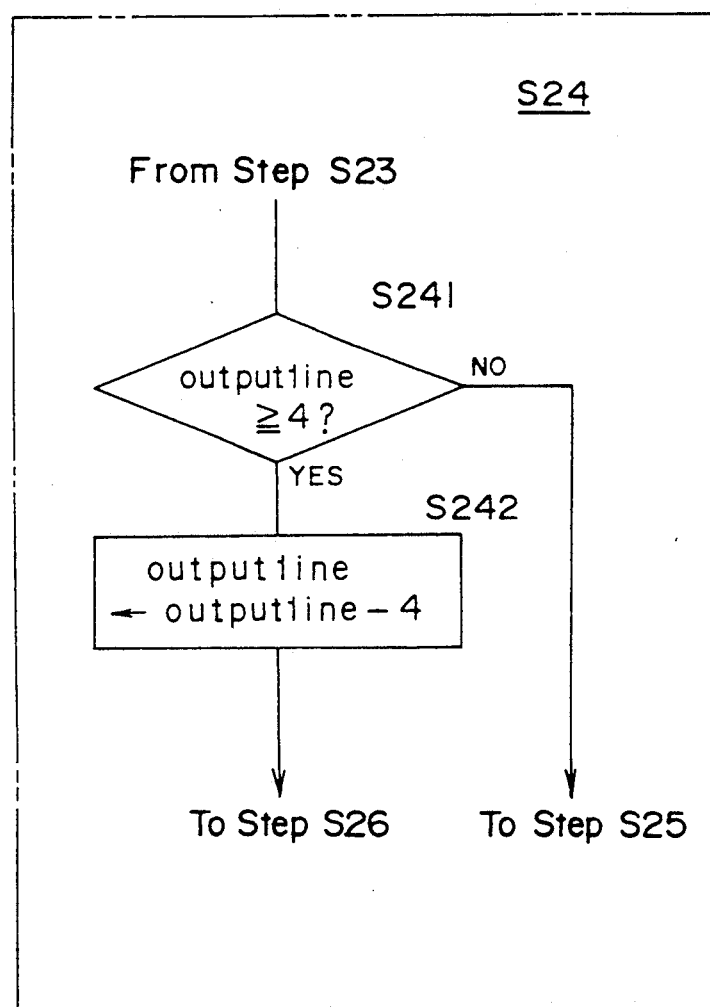
FIG. 22 is a flow chart showing details of a process step S24 shown in FIG. 18.

FIG. 22 is a flow chart showing details of a process step S24 shown in FIG. 18.

Referring to FIG. 18, if it is judged as "outputline" ≧4 (YES at step S241), four is subtracted from the current parameter "outputline" and the difference of the subtracted result is set as the parameter "outputline" at step S242, and then, the stepping motor M64 is driven so as to be rotated at step S26 of FIG. 18. Further, if it is judged as "outputline" <4 (NO at step S241), the stepping motor M64 is stopped at step S25. It is to be noted that judgments of steps S21 and S28 are performed in synchronous with the CPUHSYNC signal inputted to the CPU 71.

A concrete example of the resolution conversion process will be described below.

(1) In a case of a set resolution of 400 dpi which is the same as the reading resolution or the standard resolution of the scanner Ia, in the process of the image data of each reading one scanning line, when the output line parameter "outputline" changes sequentially so that 0→1→2→3→4 (=0), the resolution parameter "dpinum" changes sequentially so that 0→400→800→1200→1600 (=0), respectively. In this case, the resolution parameter "dpinum" becomes equal to or larger than 1600 (YES at step S214), and then, the output of the image data is permitted. On the other hand, when the parameter "outputline" becomes equal to or larger than four (YES at step S241), the stepping motor M64 is rotated. Therefore, when the signal stop request signal from the external data processing unit 3 is in an OFF state, the stepping motor M64 is always driven and the image data are outputted always.

(2) In a case of a set resolution of 200 dpi, in the process of the image data of the reading first scanning line (the output first scanning line), when the output line parameter "outputline" changes sequentially so that 0→1→2→3→4 (=0), the resolution parameter "dpinum" changes sequentially so that 0→200→400→600→800, respectively. In this case, since the parameter "outputline" becomes equal to or larger than four (YES at step S241), the stepping motor M64 is rotated. However, since the resolution parameter "dpinum" does not become equal to or larger than 1600 (NO at step S214), and then, the image data are not outputted.

Thereafter, in the process of the image data of the reading second scanning line (the output second scanning line), when the output line parameter "outputline" changes sequentially so that 0→1→2→3→4 (=0), the resolution parameter "dpinum" changes so that 800→1000→1200→1400→1600 (=0), respectively. In this case, since the parameter "outputline" becomes equal to or larger than four (YES at step S241), the stepping motor M64 is rotated. On the other hand, since the resolution parameter "dpinum" become equal to or larger than 1600 (YES at step S214), and then, the image data are outputted.

The above-mentioned processes are repeated in a manner similar to that of the above, the stepping motor M64 is always turned on, and the control of the output of the image data is changed sequentially by the reading one line so that it is tuned on, is turned off, is turned on, and is turned off, . . .

(3) In a case of a set resolution of 800 dpi, in the process of the image data of the reading first scanning line (the output first scanning line), when the output line parameter "outputline" changes sequentially so that 0→1→2, the resolution parameter "dpinum" changes sequentially so that 0→800→1600 (=0), respectively. In this case, since the resolution parameter "dpinum" becomes equal to or larger than 1600 (YES at step S214), and then, the image data of the reading line are outputted. However, since the parameter "outputline" does not become equal to or larger than four (NO at step S241), the stepping motor M64 is stopped.

Thereafter, in the process of the image data of the reading second scanning line (the output second scanning line), when the output line parameter "outputline" changes sequentially so that 2→3→4 (=0), the resolution parameter "dpinum" changes so that 0→800→1600 (=0), respectively. In this case, since the resolution parameter "dpinum" become equal to or larger than 1600 (YES at step S214), and then, the image data are outputted. On the other hand, since the parameter "outputline" becomes equal to or larger than four (YES at step S241), the stepping motor M64 is rotated.

The above-mentioned processes are repeated in a manner similar to that of the above, the driving control of the stepping motor M64 is changed sequentially by the reading one line so that it is tuned off, is turned on, is turned off, is turned on, is turned off, . . . On the other hand, the image data are always outputted.

Figure 24:
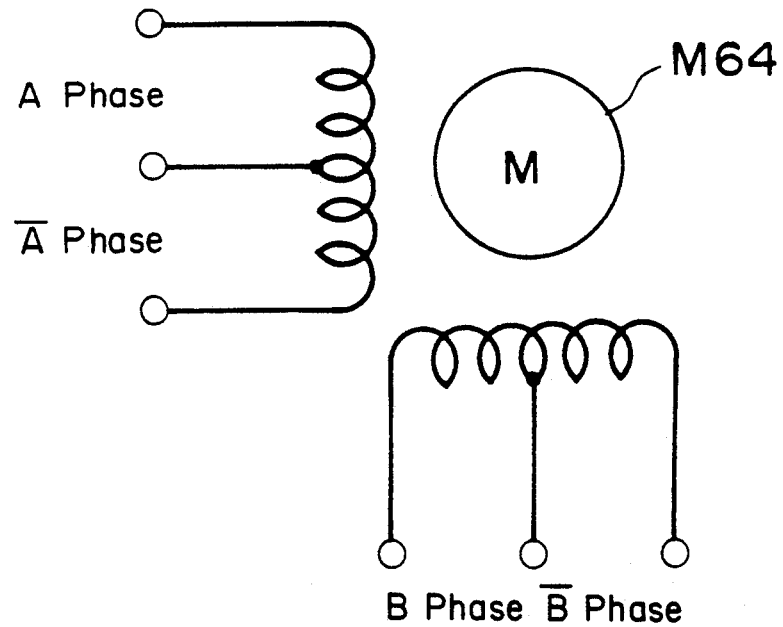
FIG. 24 is a circuit diagram showing a driving circuit of a stepping motor M64 shown in FIG. 6.
Figure 25:
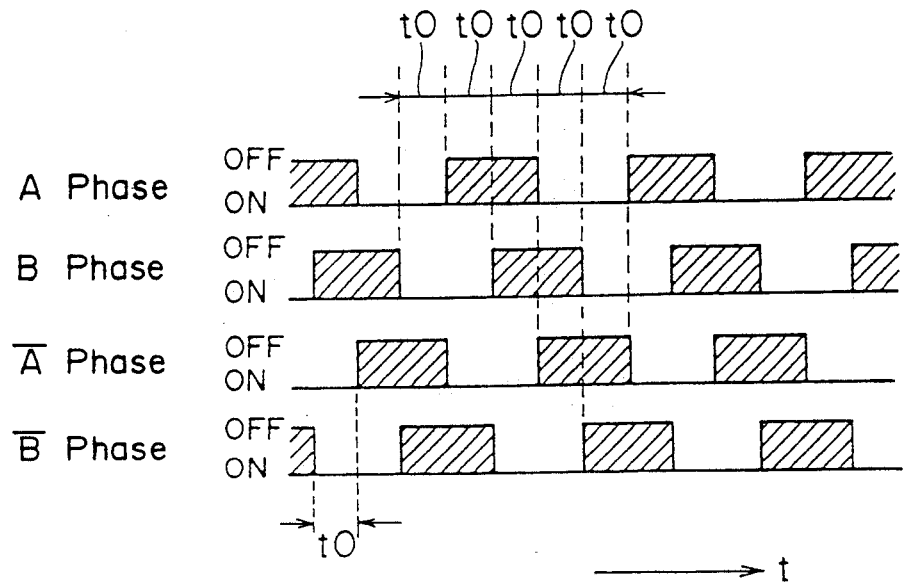
FIG. 25 is a timing chart showing respective driving signals when driving the stepping motor M64 shown in FIG. 24 using a two phase excitation method.
Figure 26:
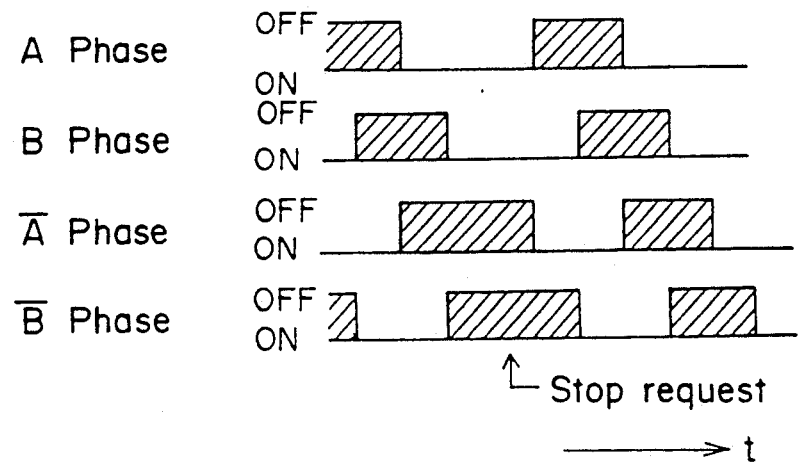
FIG. 26 is a timing chart showing respective driving signals when stopping rotation of the stepping motor M64 shown in FIG. 24 in response to a signal stop request signal from the external date processing unit 3.

The control operation of rotation/stop of the stepping motor M64 will be described in detail below. In the image reading system of the present preferred embodiment, the stepping motor M64 of pulse motor is used for transferring the document in the scanner 1a, and the stepping motor M64 is control by four driving signals by two phase excitation method, as shown in FIGS. 24 and 25. When each of the driving signals of respective phases A, $\overline{A}$, B and $\overline{B}$ is sequentially turned on and off periodically by a time interval t0 in response to the driving signal from the CPU 71, the stepping motor M64 is rotated at a speed 1/t0 [pps], and then, the document is moved in the subscan direction by one scanning line every time interval t0. It is to be noted that the time interval t0 is the same as the period of the CPUHSYNC signal inputted to the CPU 71.

Further, the stop of driving of the stepping motor M64 will be described below.

As described above, the CPU 71 controls the operation of the rotation/stop of the stepping motor M64 in synchronous with the CPUHSYNC signal. Namely, when the motor driving signal from the CPU 71 is in an OFF state, the scanner mechanism 64 controls the driving signals to be outputted to the stepping motor M64 so as to maintain the driving signals of the current phase, however, the driving signals of the next phase are not outputted to the stepping motor M64. Further, when the CPU 71 receives the signal stop request signal from the external data processing unit 3, the driving signals of new phase are not outputted to the stepping motor M64, resulting in stopping rotation of the stepping motor M64. In this case, when the signal stop request signal has been turn on continuously for a predetermined time interval such as 50 msec., the driving signals of all the phases are turned off.

It is to be noted that, in the present preferred embodiment, the operation of rotation/stop of the stepping motor M64 is controlled based on the motor driving signal directly outputted from the CPU 71. However, the present invention is not limited to this. A control signal such as a line signal may be outputted from the CPU 71 to the resolution converter 75, and turning on and off of the stepping motor M64 may be controlled based on a response signal from the resolution converter 75.

FIGS. 28 to 32 are timing charts of respective signals in respective cases in the above-mentioned scanner mode.

Figure 28:
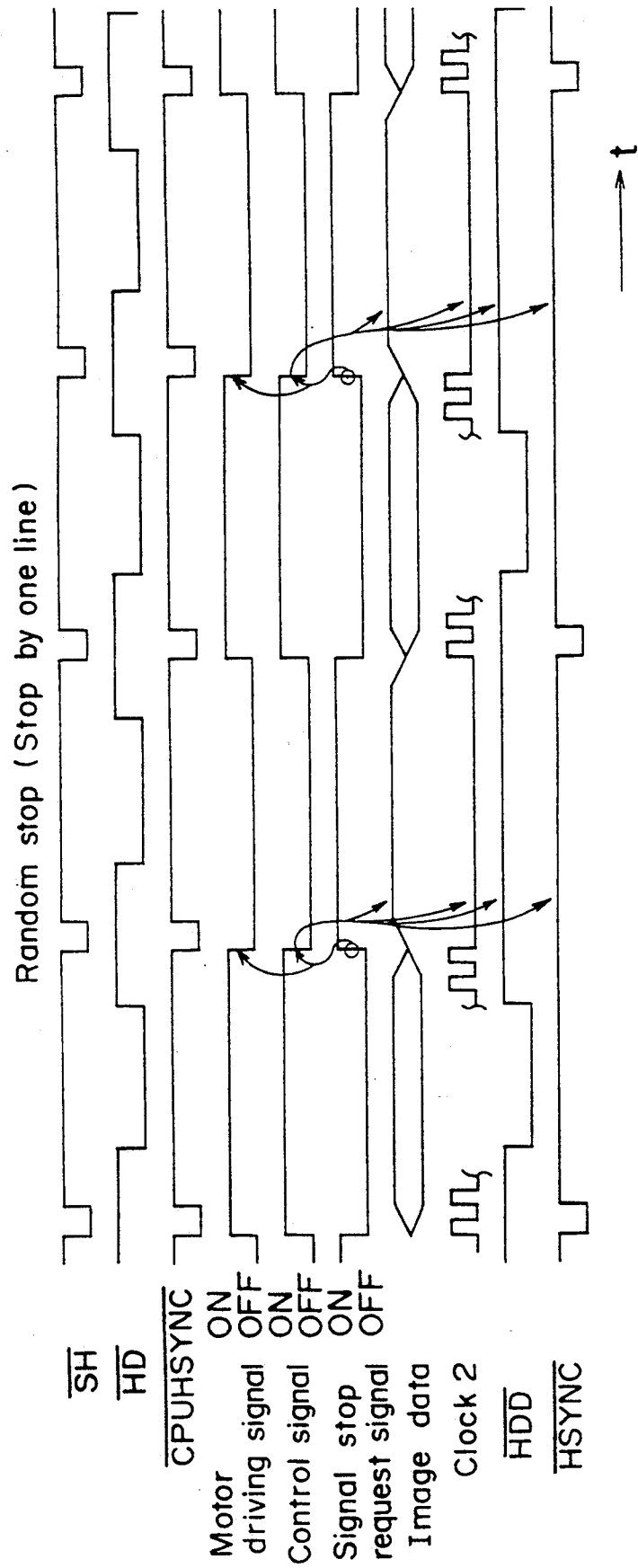
FIG. 28 is a timing chart showing a relationship among respective signals in a case of a random stop in a scanner mode.

FIG. 28 is a timing chart showing a relationship among respective signals in a case of a random stop in a scanner mode. In this case, the processing speed of the image data of the external data processing unit 3 is relatively low, and the signal stop request signal is inputted every one scanning line from the external data processing unit 3 to the CPU 71.

Figure 29:
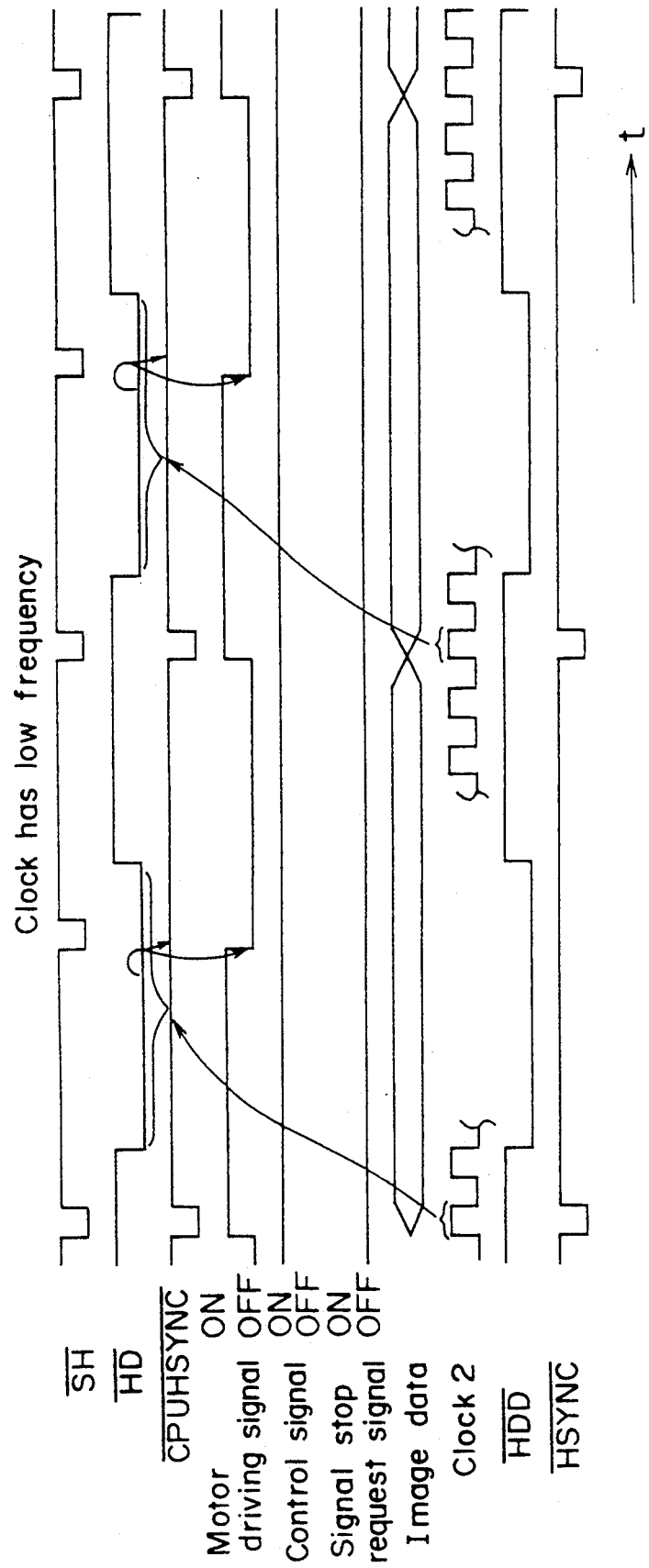
FIG. 29 is a timing chart showing a relationship among respective signals in a case of a clock having a low frequency.

FIG. 29 is a timing chart showing a relationship among respective signals in a case of a clock having a low frequency. In this case, the selector 83 selects as the clock 2 the second clock signal having the frequency lower than that of the clock 1 from the first and second clock signals outputted from the counter 82, 400 dpi is set as the output resolution.

Figure 30:
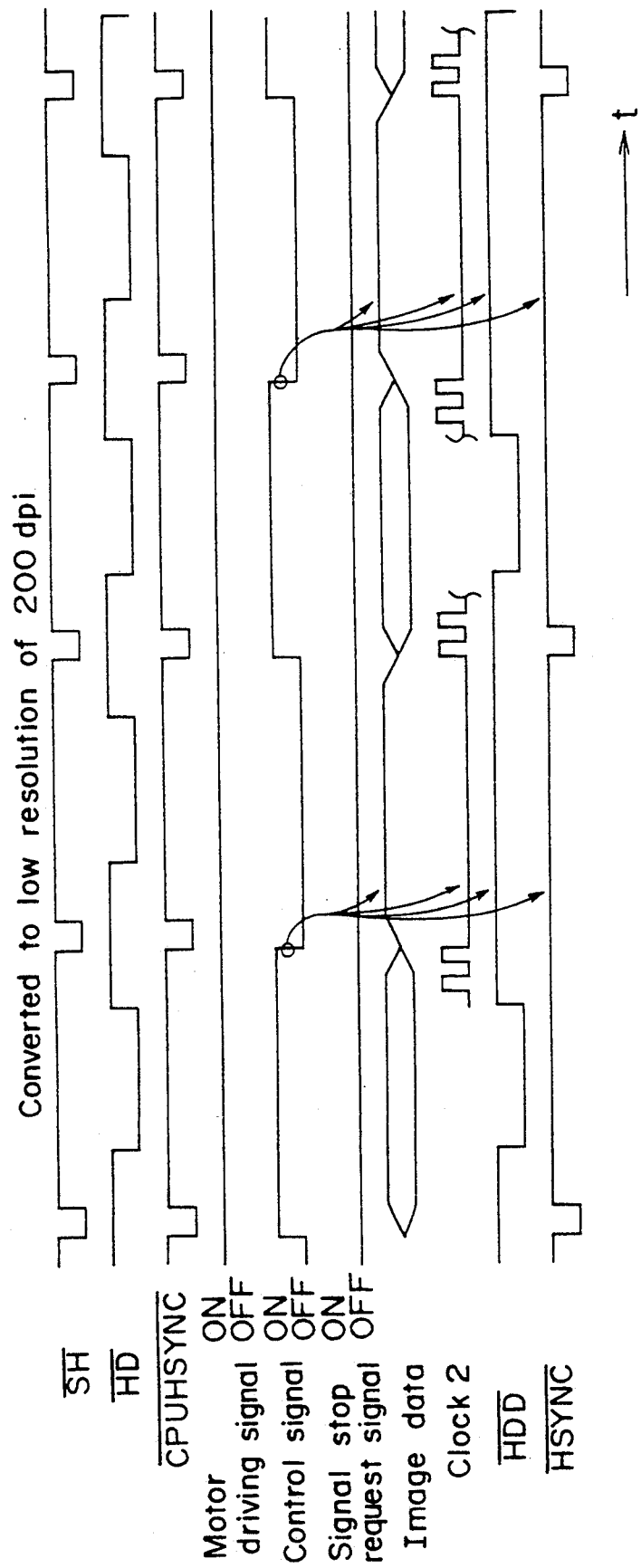
FIG. 30 is a timing chart showing a relationship among respective signals when converting read image data into image data having a lower resolution in the scanner mode.
Figure 31:
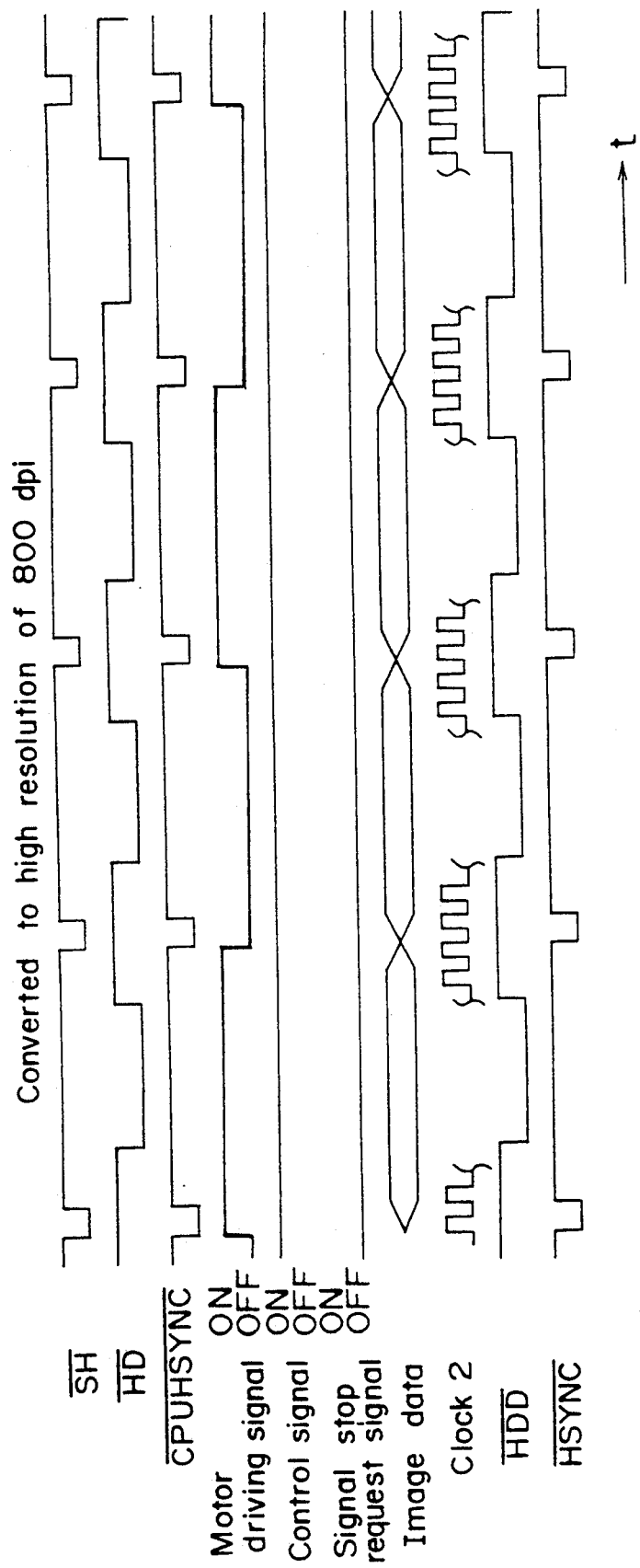
FIG. 31 is a timing chart showing a relationship among respective signals when converting read image data into image data having a higher resolution in the scanner mode.

FIGS. 30 and 31 are timing charts showing a relationship among respective signals when the clock 1 is the same as the clock 2. Further, FIG. 30 shows the case of converting read image data into image data having a lower resolution of 200 dpi in the scanner mode, and FIG. 31 shows the case of converting read image data into image data having a higher resolution of 800 dpi in the scanner mode.

Figure 32:
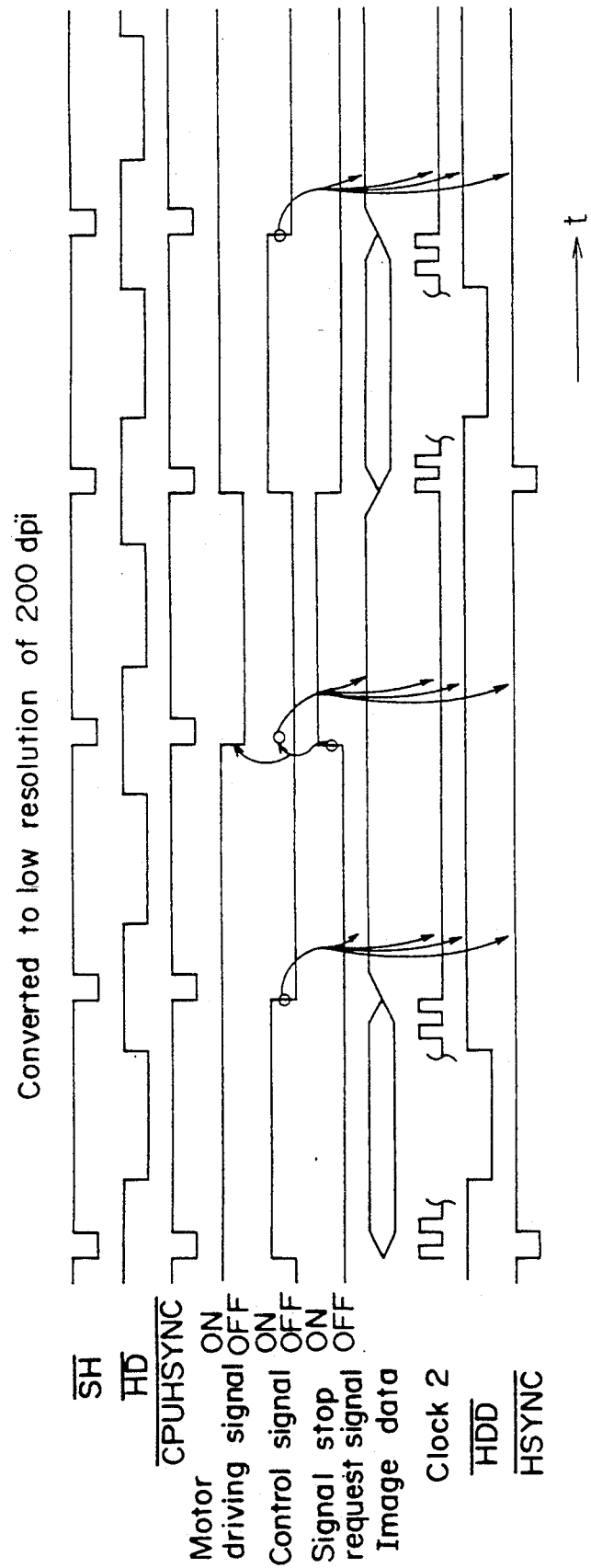
FIG. 32 is a timing chart showing a relationship among respective signals when converting read image data into image data having a lower resolution and when the signal stop request signal is inputted to the scanner printer 1 in the scanner mode.

FIG. 32 is a timing chart showing a relationship among respective signals when converting read image data into image data having a lower resolution of 200 dpi and when the signal stop request signal is inputted to the scanner printer 1 in the scanner mode.

Printer mode

Figure 27:
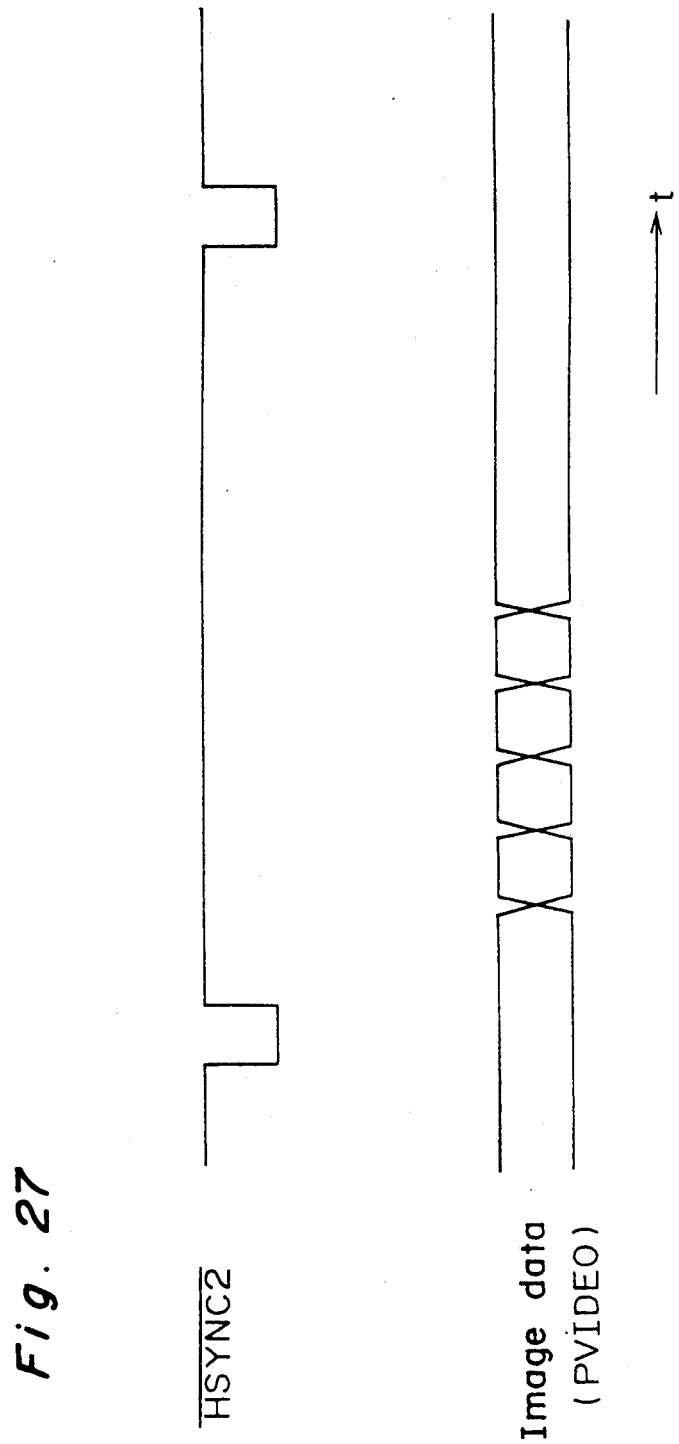
FIG. 27 is a timing chart showing a relationship between an HSYNC2 signal and image data in a printer mode.

When the external data processing unit 3 generates a printing request signal in a manner similar to that in the scanner mode, the external data processing unit 3 transmits a command signal for representing specifications of the printing operation in the laser printer 1b and printing data PVIDEO for representing the contents of print through the controller 2 and the interface 67 of the controller 63 to the CPU 71. In response to the command signal and the image data PVIDEO, the CPU 71 drives the laser printer 1b, and controls the horizontal synchronizing selector 68 to select the horizontal synchronizing signal $\overline{\text{HSYNC2}}$ (referred to as an HSYNC2 signal hereinafter) from the laser printer 1b and to output it through the interface 2 and the controller 67 to the external data processing unit 3. Then, as shown in FIG. 27, the printing data PVIDEO are transmitted in synchronous with a HSYNC2 signal from the external data processing unit 3 through the controller 2 and the interface 67 to the laser driver 66, resulting in printing an image of the image data PVIDEO on a piece of paper.

Copier mode

As described above, after various kinds of setting operations in the copier mode is performed using the operation panel 4 such as a setting operation for setting the exposure level, a setting operation for setting the reading mode or selecting either one of the character reading mode and the photograph reading mode, both of the scanner 1a and the laser printer 1b are driven, and the image data converted by the scanner 1a after reading the document image are transmitted to the laser printer 1b in synchronous with the HSYNC2 signal from the laser printer 1b, thereby performing the copying process.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reading apparatus comprising:
   signal generating means for generating a clock signal having a predetermined frequency, and generating a horizontal synchronizing signal in synchronous with said clock signal;
   image reading means for reading a document image by scanning said document image in a main scan direction every horizontal scanning line in synchronous with said clock signal, and converting said read document image into an image signal;
   moving means for moving said image reading means and said document image relatively to each other in a subscan direction perpendicular to said main scan direction by one horizontal scanning line in synchronous with said clock signal;
   signal outputting means for outputting said horizontal synchronizing signal and said image signal to an external apparatus;
   receiving means for receiving a stop request signal from said external apparatus; and
   control means for controlling said moving means and said signal outputting means to stop the operations of said moving means and said signal outputting means, in response to said stop request signal received by said receiving means.

2. The apparatus as claimed in claim 2, further comprising further receiving means for receiving a resolution signal for representing a resolution of said image signal to be outputted, said resolution signal being inputted from said external apparatus.

3. An image reading apparatus comprising:

signal generating means for generating a horizontal synchronizing signal;

image reading means for reading a document image by scanning said document image in a main scan direction every horizontal scanning line, and converting said read document image into an image signal;

moving means for moving said image reading means and said document image relatively to each other in a subscan direction perpendicular to said main scan direction by one horizontal scanning line;

signal outputting means for outputting said horizontal synchronizing signal to an external apparatus, and outputting and said image signal to said external apparatus in synchronous with said horizontal synchronizing signal;

receiving means for receiving a stop request signal from said external apparatus; and control means for controlling said moving means and said signal outputting means to stop outputting said horizontal synchronizing signal and to stop moving said image reading means and said document image relatively to each other, in response to said stop request signal received by said receiving means.

4. The apparatus as claimed in claim 3, further comprising:

a document tray for setting a plurality of documents; and paper feeding means for feeding said document by one document from said document tray to said image reading means.

5. The apparatus as claimed in claim 4, wherein said paper feeding means comprises a transfer roller for transferring said document so as to be in contact with said document 6. An image reading apparatus comprising:

signal generating means for generating a plurality of clock signals having predetermined frequencies different from each other, respectively;

receiving means for receiving a selection signal for representing one clock signal to be selected among said plurality of clock signals, said selection signal being inputted from an external apparatus;

signal selecting means for selecting either one of said plurality of clock signals generated by said signal generating means in response to said selection signal received by said receiving means, and outputting said selected clock signal;

image reading means for reading a document image by scanning said document image in a main scan direction every horizontal scanning line in synchronous with said clock signal outputted from said signal selecting means, and converting said read document image into an image signal;

further signal generating means for generating a horizontal synchronizing signal in synchronous with said clock signal outputted from said signal selecting means; and signal outputting means for outputting said horizontal synchronizing signal and said image signal to an external apparatus.

7. An image reading apparatus comprising:

signal generating means for generating a clock signal having a predetermined frequency, and generating a horizontal synchronizing signal in synchronous with said clock signal;

image reading means for reading a document image by scanning said document image in a main scan direction every horizontal scanning line in synchronous with said clock signal, and converting said read document image into an image signal;

moving means for moving said image reading means and said document image relatively to each other in a subscan direction perpendicular to said main scan direction by one horizontal scanning line in synchronous with said clock signal;

signal outputting means for outputting said horizontal synchronizing signal and said image signal to an external apparatus;

receiving means for receiving a resolution signal from said external apparatus;

first controlling means for prohibiting said moving means from moving with a predetermined frequency in response to said resolution signal received by said receiving means; and second controlling means for prohibiting said signal outputting means from outputting said horizontal synchronizing signal and said image signal with a predetermined frequency in response to said resolution signal received by said receiving means.

8. An image reading apparatus comprising:

signal generating means for generating a clock signal having a predetermined frequency, and generating a horizontal synchronizing signal in synchronous with said clock signal;

image reading means for reading a document image by scanning said document image in a main scan direction every horizontal scanning line in synchronous with said clock signal, and converting said read document image into an image signal;

moving means for moving said image reading means and said document image relatively to each other in a sub scan direction perpendicular to said main scan direction at a predetermined moving speed by one horizontal scanning line in synchronous with said clock signal;

signal outputting means for outputting said horizontal synchronizing signal and said image signal to an external apparatus;

receiving means for receiving either one of a high resolution signal for representing that said image signal to be outputted has a predetermined high resolution, and a low resolution signal for representing that said image signal to be outputted has a predetermined low resolution smaller than said predetermined high resolution, said high and low resolution signals being inputted from said external apparatus;

first controlling means for controlling the moving speed of said moving means so that said image signal has said predetermined high resolution, in response to said high resolution signal received by said receiving means; and second controlling means for controlling said signal outputting means so that said image signal has said predetermined low resolution and said horizontal synchronizing signal is thinned out with a ratio corresponding to said predetermined low resolution and is outputted to said external apparatus, in response to said low resolution signal received by said receiving means.

9. An image reading apparatus comprising:

signal generating means for generating a clock signal having a predetermined frequency, and generating a horizontal synchronizing signal in synchronous with said clock signal;

image reading means for reading a document image by scanning said document image in a main scan direction every horizontal scanning line in synchronous with said clock signal, and converting said read document image into an image signal;

moving means for moving said image reading means and said document image relatively in a subscan direction perpendicular to said main scan direction to each other by one horizontal scanning line in synchronous with said clock signal;

first outputting means for outputting said image signal to an external apparatus;

second outputting means for outputting said horizontal synchronizing signal in synchronous with said image signal outputted by said first outputting means;

receiving means for receiving a resolution signal from said external apparatus; and controlling means for controlling said second outputting means so that said horizontal synchronizing signal is thinned out with a ratio corresponding to said resolution signal received by said receiving means and is outputted to said external apparatus.

10. An image reading apparatus comprising:

image reading means for reading a document image by scanning said document image in a main scan direction every horizontal scanning line, and converting said read document image into an image signal;

moving means for moving said image reading means and said document image relatively to each other in a subscan direction perpendicular to said main scan direction by one horizontal scanning line in synchronous with the reading operation of said image reading means;

receiving means for receiving a resolution signal from said external apparatus; and signal outputting means for thinning out said image signal with a predetermined frequency in a unit of said horizontal scanning line so that a number of horizontal scanning lines in said subscan direction decreases when said receiving means receives said resolution signal, and outputting said thinned image signal to said external apparatus.

11. An image reading apparatus comprising:

image reading means for reading a document image by scanning said document image in a main scan direction every horizontal scanning line, and converting said read document image into an electric signal for representing said read document image;

moving means for moving said image reading means and said document image relatively to each other in a subscan direction perpendicular to said main scan direction at a predetermined moving speed by one horizontal scanning line;

signal outputting means for outputting a line image signal corresponding to one horizontal scanning line of said document image with a predetermined frequency, based on said electric signal from said image reading means;

receiving means for receiving a resolution signal from said external apparatus; and controlling means for controlling said signal outputting means so as to change the frequency with which said line image signal is outputted when said receiving means receives said resolution signal.

12. An image reading apparatus comprising:

first signal generating means for generating a clock signal having a predetermined frequency, and generating a horizontal synchronizing signal in synchronous with said clock signal;

image reading means for reading a document image by scanning said document image in a main scan direction every horizontal scanning line in synchronous with said clock signal, and converting said read document image into an image signal;

moving means for moving said image reading means and said document image relatively to each other in a subscan direction perpendicular to said main scan direction at a predetermined moving speed by one horizontal scanning line in synchronous with said clock signal;

signal outputting means for outputting said horizontal synchronizing signal and said image signal to an external apparatus;

second signal generating means for generating an internal subscan effect signal for representing an effective time interval in said subscan direction of said image signal in synchronous with said clock signal;

receiving means for receiving an external subscan effect signal for presenting an effective time interval in said subscan direction of an image signal for which said external apparatus can receive and process, said external subscan effect signal being inputted from said external apparatus;

first controlling means for controlling said signal outputting means to output said image signal when said internal subscan effect signal is generated by said second signal generating means and said external subscan effect signal is received by said receiving means; and second controlling means for controlling said signal outputting means to output an image signal of a predetermined pixel to said external apparatus when said internal subscan effect signal is not generated by said second signal generating means and said external subscan effect signal is received by said receiving means.

13. The apparatus as claimed in claim 12, wherein said image signal of said predetermined pixel is an image signal of white pixel.

14. The apparatus as claimed in claim 12, wherein said image signal of said predetermined pixel is an image signal of black pixel.

15. An image reading apparatus for reading an image of a document and converting said read image into an image signal, comprising:

signal outputting means for outputting said converted image signal to an external apparatus;

receiving means for receiving a predetermined signal from said external apparatus; and controlling means for controlling said signal outputting means to output a predetermined image signal to said external apparatus for a time interval, from a first timing when output of said image signal corresponding to one page of said document by said signal outputting means is completed, to a second time interval when said receiving means receives said predetermined signal.

16. The apparatus as claimed in claim 15, further comprising signal generating means for generating a clock signal having a predetermined frequency, wherein said signal outputting means outputs said image signal in synchronous with said clock signal.

17. The apparatus as claimed in claim 15, wherein said predetermined image signal is an image signal of white pixel.

18. The apparatus as claimed in claim 15, wherein said predetermined image signal is an image signal of black pixel.

19. The apparatus as claimed in claim 15, wherein said predetermined signal from said external apparatus is a vertical synchronizing signal.

* * * * *